US00RE46760E

(19) United States
(12) Reissued Patent
Belanger et al.

(10) Patent Number: US RE46,760 E
(45) Date of Reissued Patent: Mar. 27, 2018

(54) ADJUSTABLE HOCKEY HELMET

(71) Applicant: BAUER HOCKEY, LLC, Exeter, NH (US)

(72) Inventors: Guillaume Belanger, Terrebonne (CA); Jean-Francois Beland, Sainte-Therese (CA)

(73) Assignee: BAUER HOCKEY, LLC, Exeter, NH (US)

(21) Appl. No.: 15/268,127

(22) Filed: Sep. 16, 2016

Related U.S. Patent Documents

Reissue of:
(64) Patent No.: 8,832,870
Issued: Sep. 16, 2014
Appl. No.: 13/654,260
Filed: Oct. 17, 2012

U.S. Applications:
(63) Continuation of application No. 12/191,000, filed on Aug. 13, 2008, now Pat. No. 8,296,868.

(60) Provisional application No. 60/956,621, filed on Aug. 17, 2007.

(51) Int. Cl.
*A42B 3/32* (2006.01)

(52) U.S. Cl.
CPC ..... *A42B 3/324* (2013.01)

(58) Field of Classification Search
CPC ..... A42B 3/324
USPC ..... 2/420, 414, 425, 421, 9, 411, 417, 418, 2/423, 424
See application file for complete search history.

(56) References Cited

U.S. PATENT DOCUMENTS 2,926,406 A 3/1960 Edwards et al. ..... A42B 3/145 2/418
3,087,166 A * 4/1963 Howard ..... A42B 3/00 2/420
3,214,809 A 11/1965 Edwards ..... A61F 9/06 2/418
3,845,505 A 11/1974 Davison ..... A42B 3/166 2/209
3,897,597 A * 8/1975 Kasper ..... A42B 3/28 2/10
4,404,690 A 9/1983 Farquharson ..... A42B 3/12 2/420

(Continued)

FOREIGN PATENT DOCUMENTS

CA 1183302 * 3/1985
CA 1183302 A1 3/1985

(Continued)

OTHER PUBLICATIONS

U.S. Appl. No. 75/143,500, filed Sep. 1, 1992, Schuring.

*Primary Examiner* — William Doerrler

(74) *Attorney, Agent, or Firm* — Perkins Coie LLP

(57) ABSTRACT

An adjustable hockey helmet includes a front shell that is longitudinally movable relative to a rear shell to adjust the length of the helmet. One or more substantially rigid straps or similar elements are attached to the front shell and extend to the interior of the rear shell. A cam mechanism or similar device is included on the rear shell for securing the straps directly or indirectly against the interior of the rear shell to prevent longitudinal movement of the front shell relative to the rear shell once the helmet is adjusted to a desired length. Alternatively, the one or more straps may be attached to the rear shell and the cam mechanism may be included on the front shell.

48 Claims, 25 Drawing Sheets

(56) References Cited

U.S. PATENT DOCUMENTS 4,477,929 A * 10/1984 Mattsson ..... A42B 3/324 2/417
4,539,715 A 9/1985 Clement ..... A42B 3/324 2/420
4,827,537 A 5/1989 Villa ..... A42B 3/322 2/410
4,843,642 A 7/1989 Brower ..... A42B 3/125 2/414
4,856,950 A 8/1989 Bushnell ..... F16B 19/1081 411/41
4,903,349 A 2/1990 Arai ..... A42B 3/08 2/421
4,942,628 A * 7/1990 Freund ..... A42B 3/145 2/410
5,249,347 A * 10/1993 Martinitz ..... A42B 3/20 2/424
5,315,718 A * 5/1994 Barson et al. ..... A42B 3/08 2/418
5,412,814 A * 5/1995 Pernicka et al. ..... A42B 3/20 2/424
5,483,699 A * 1/1996 Pernicka et al. ..... A42B 3/22 2/424
5,540,528 A 7/1996 Schmidt ..... F16B 19/1081 24/297
5,571,217 A * 11/1996 Del Bon et al. ..... A42B 3/14 2/8.1
D400,311 S * 10/1998 Chartrand ..... D29/122
D401,018 S 11/1998 Chartrand ..... D29/106
5,845,341 A * 12/1998 Barthold et al. ..... A42B 3/04 2/10
5,956,776 A 9/1999 Chartrand ..... A42B 3/324 2/420
6,101,636 A * 8/2000 Williams ..... A42B 3/0406 2/410
6,108,824 A 8/2000 Fournier et al. ..... A42B 3/324 2/418
6,125,477 A * 10/2000 Crippa et al. ..... A42B 3/222 2/10
6,202,223 B1 3/2001 Chartrand ..... A42B 3/127 2/410
6,256,798 B1 7/2001 Egolf et al. ..... A42B 3/145 2/417
6,272,692 B1 * 8/2001 Abraham ..... A42B 3/063 2/411
6,298,497 B1 10/2001 Chartrand ..... A42B 3/12 2/414
6,314,588 B1 11/2001 Fang ..... A42B 3/145 2/183
6,324,700 B1 12/2001 McDougall ..... A42B 3/324 2/414
6,338,165 B1 * 1/2002 Biondich ..... A42B 3/20 2/424
6,385,780 B1 5/2002 Racine ..... A42B 3/12 2/414
6,389,607 B1 * 5/2002 Wood ..... A42B 3/00 2/411
D463,885 S 10/2002 Burns ..... D29/111
6,708,376 B1 3/2004 Landry ..... A42B 3/145 2/418
6,772,447 B2 * 8/2004 Morrow et al. ..... A42B 3/08 2/414
6,865,752 B2 * 3/2005 Udelhofen et al. .... A42B 3/324 2/418
6,883,183 B2 * 4/2005 Morrow et al. ..... A42B 3/08 2/10
6,886,183 B2 * 5/2005 DeHaan et al. ..... F41H 1/04 2/6.7
6,952,839 B2 * 10/2005 Long ..... A42B 3/324 2/414
6,961,963 B2 * 11/2005 Rosie ..... A42B 3/32 128/200.28
6,966,075 B2 * 11/2005 Racine ..... A42B 3/324 2/418
6,968,575 B2 * 11/2005 Durocher ..... A42B 3/324 2/418
6,981,284 B2 * 1/2006 Durocher ..... A42B 3/324 2/417
7,000,262 B2 2/2006 Bielefeld ..... A42B 3/145 2/418
7,043,772 B2 5/2006 Bielefeld ..... A42B 3/145 2/418
7,110,743 B2 9/2006 Depew et al. ..... A42B 3/30 381/375
7,174,575 B1 2/2007 Scherer ..... A42B 3/145 2/418
D540,491 S * 4/2007 Tiegs ..... D29/112
7,765,608 B2 * 8/2010 Durocher et al. ..... A42B 3/20 2/424
8,037,548 B2 * 10/2011 Alexander et al. .... A42B 3/127 2/417
2001/0034895 A1 * 11/2001 Ikeda ..... A42B 3/127 2/414
2002/0035748 A1 * 3/2002 Racine ..... A42B 3/12 2/414
2003/0070201 A1 * 4/2003 McClelland ..... A42B 3/20 2/9
2003/0106138 A1 * 6/2003 Guay ..... A42B 3/145 2/418
2003/0135914 A1 * 7/2003 Racine et al. ..... A42B 3/122 2/413
2003/0221245 A1 * 12/2003 Lee et al. ..... A42B 3/063 2/412
2004/0040073 A1 * 3/2004 Morrow et al. ..... A42B 3/08 2/424
2004/0117897 A1 * 6/2004 Udelhofen et al. .... A42B 3/324 2/421
2004/0172739 A1 * 9/2004 Racine ..... A42B 3/324 2/417
2005/0015857 A1 * 1/2005 Desjardins et al. ..... 2/417
2005/0034222 A1 * 2/2005 Durocher ..... A42B 3/324 2/425
2005/0034223 A1 * 2/2005 Durocher ..... A42B 3/324 2/425
2005/0115857 A1 * 6/2005 Homann ..... B65D 81/361 206/509
2005/0125882 A1 * 6/2005 Long ..... A42B 3/324 2/414
2005/0262619 A1 * 12/2005 Musal et al. ..... A42B 3/08 2/421
2006/0150304 A1 7/2006 Bentz ..... A42B 3/08 2/421
2007/0079429 A1 4/2007 Pilon et al. ..... A42B 3/324 2/410
2007/0266481 A1 * 11/2007 Alexander ..... A42B 3/127 2/414
2008/0276354 A1 * 11/2008 Stokes ..... A42B 3/145 2/418

FOREIGN PATENT DOCUMENTS

CA 2191683 * 5/1998
CA 2191683 C 5/1998
CA 2191693 * 5/1998
CA 2191693 C 5/1998
CA 2321399 * 1/2006
CA 2321399 C 1/2006
CA 2573639 * 1/2006
CA 2573639 A1 1/2006
CA 2573640 * 1/2006
CA 2573640 A1 1/2006
CA 2576086 * 2/2006
CA 2576086 A1 2/2006
DE 10039461 * 2/2002
DE 10039461 A1 2/2002
WO 2004000054 * 12/2003
WO 2004000054 A2 12/2003
WO 2006099928 * 6/2006

(56) References Cited

FOREIGN PATENT DOCUMENTS

| | | | | |
|---|---|---|---|---|
| WO | 2006099928 | A1 | | 9/2006 |
| WO | 2007025500 | | * | 3/2007 |
| WO | 2007025500 | A1 | | 3/2007 |

* cited by examiner

ADJUSTABLE HOCKEY HELMET

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a continuation of U.S. patent application Ser. No. 12/191,000, filed Aug. 13, 2008, which claims priority to U.S. Provisional Patent Application No. 60/956,621, filed Aug. 17, 2007, both of which are hereby incorporated by reference.

BACKGROUND

Adjustable hockey helmets are used to accommodate various head sizes of wearers. A typical adjustable hockey helmet includes a front shell that is movable or slidable relative to a rear shell to adjust the length of the helmet. Cam mechanisms or other locking devices are commonly included on the sides of the helmet to securely engage the front shell against the rear shell to prevent longitudinal movement of the shells relative to each other once the helmet is adjusted to the desired length. While existing adjustable hockey helmets have been relatively effective, it would be advantageous to have a hockey helmet that is more readily adjustable and that can more easily be secured in place.

SUMMARY

An adjustable hockey helmet includes a front shell that is longitudinally movable relative to a rear shell to adjust the length of the helmet. One or more substantially rigid straps or similar elements are attached to the front shell and extend to the interior of the rear shell. A cam mechanism or similar device is included on the rear shell for securing the straps directly or indirectly against the interior of the rear shell to prevent longitudinal movement of the front shell relative to the rear shell once the helmet is adjusted to a desired length. Alternatively, the one or more straps may be attached to the rear shell and the cam mechanism may be included on the front shell.

Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the several views.

DETAILED DESCRIPTION OF THE DRAWINGS

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list.

Figure 1:
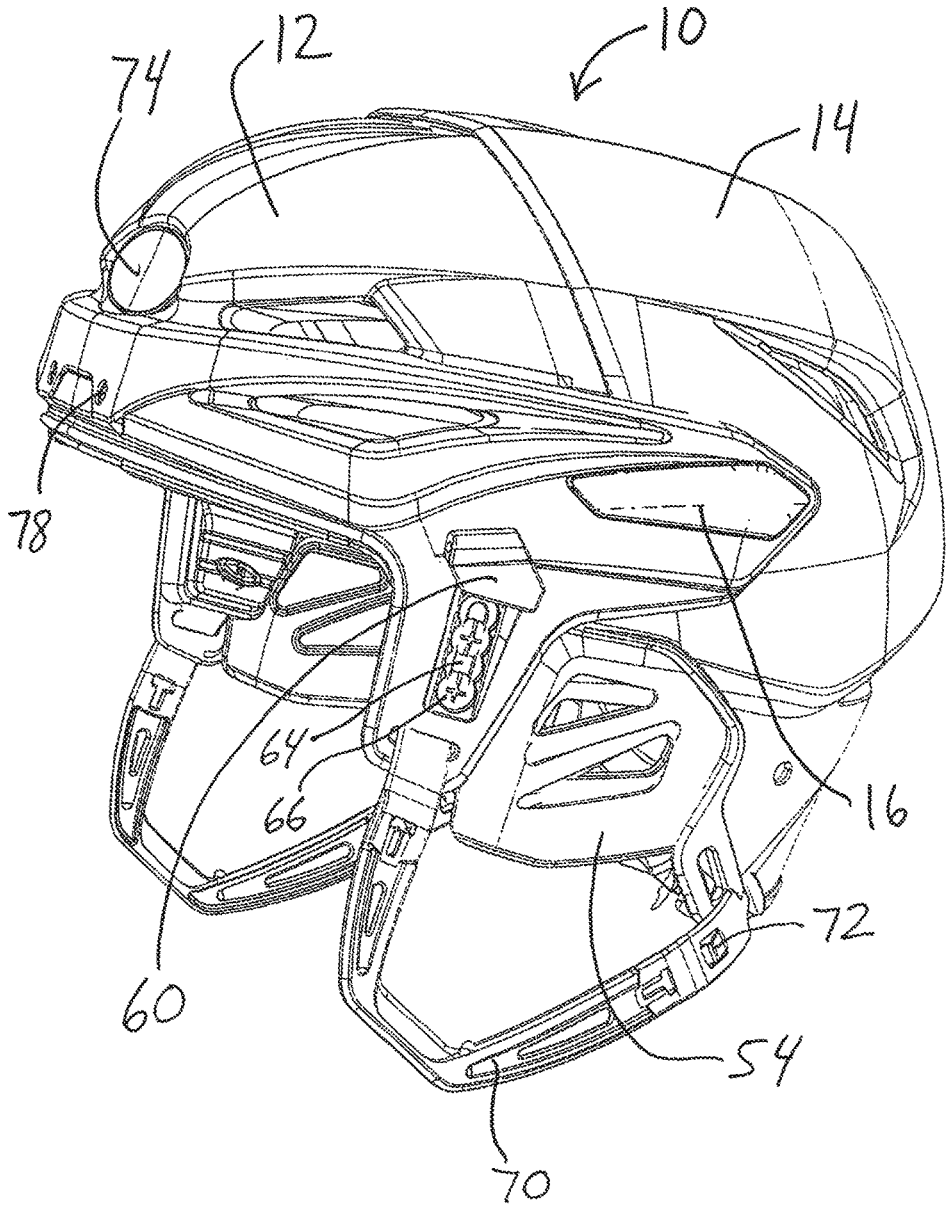
FIG. 1 is an exterior perspective view of an adjustable hockey helmet according to one embodiment.
Figure 2:
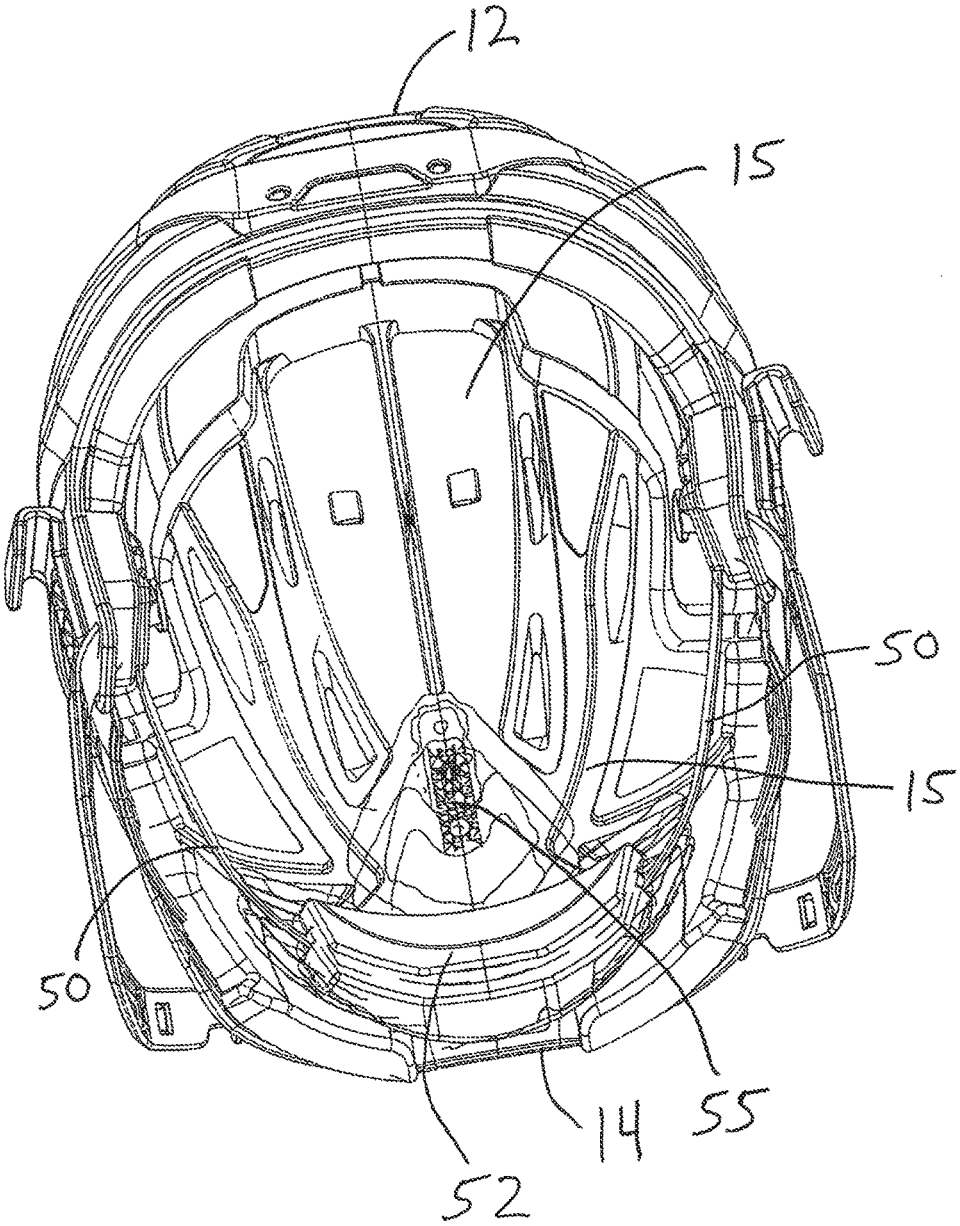
FIG. 2 is an interior perspective view of the helmet shown in FIG. 1.

Turning now in detail to the drawings, as shown in FIGS. 1-4, one embodiment of an adjustable hockey helmet 10 includes a front shell 12 and a rear shell 14. As shown in FIG. 2, the front and rear shells 12, 14 include liners of protective padding 15 screwed, adhered, or otherwise affixed to interior surfaces of the shells 12, 14. The padding 15 may be made of a foam material, such as expanded polypropylene ("EPP"), or of any other material or combination of materials suitable for protecting a wearer's head.

Figure 5:
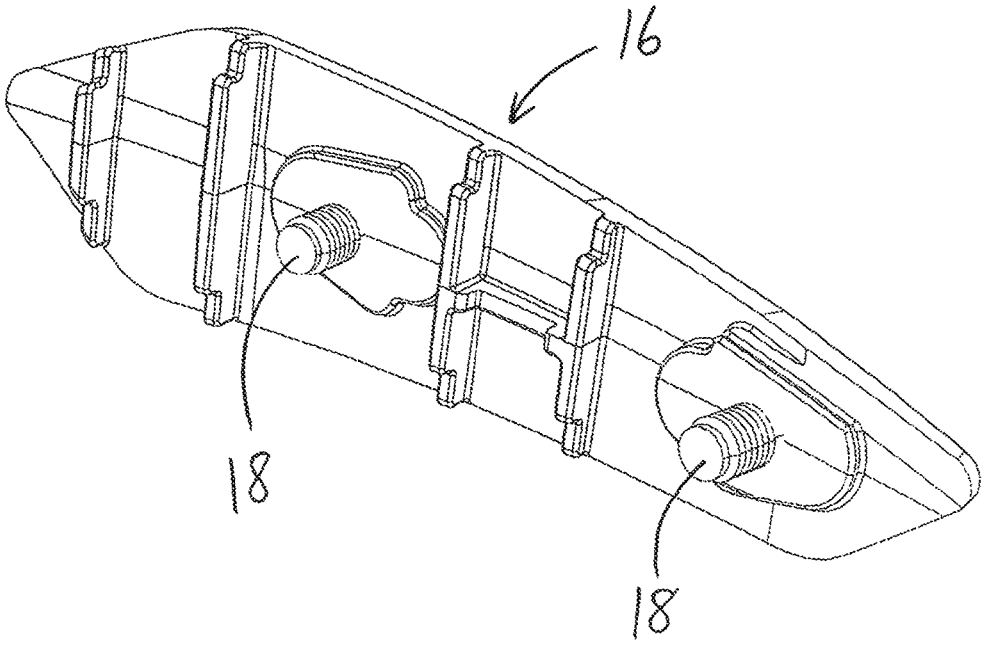
FIG. 5 is a perspective view of a side plate included on the helmet shown in FIGS. 1-4.

The front shell 12 includes two side plates 16, which are preferably positioned in recesses in the front shell 12. As is best shown in FIG. 5, two rivets 18, or other suitable connectors, are insert-molded within (or otherwise affixed to) an inner surface of each of the side plates 16. The rivets 18 are preferably made of a metal material, such as aluminum, but may be made of any other suitable material. Any other suitable number of rivets 18 may alternatively be used.

Figure 6:
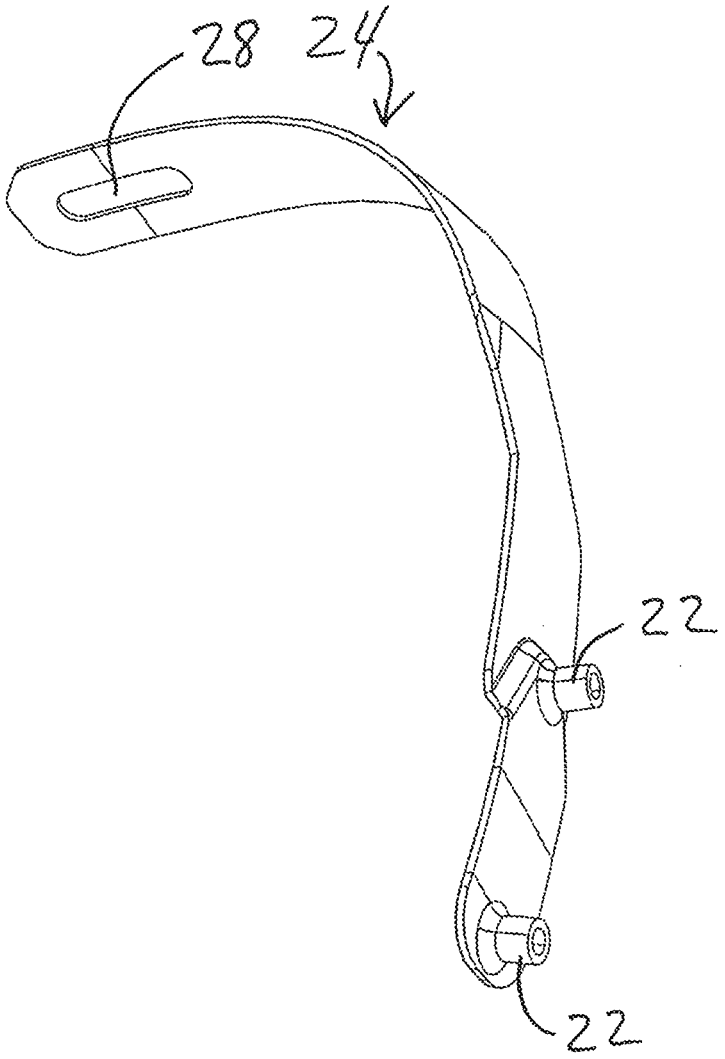
FIG. 6 is a perspective view of a side strap of the longitudinal adjustment mechanism included in the helmet shown in FIGS. 1-4.
Figure 7:
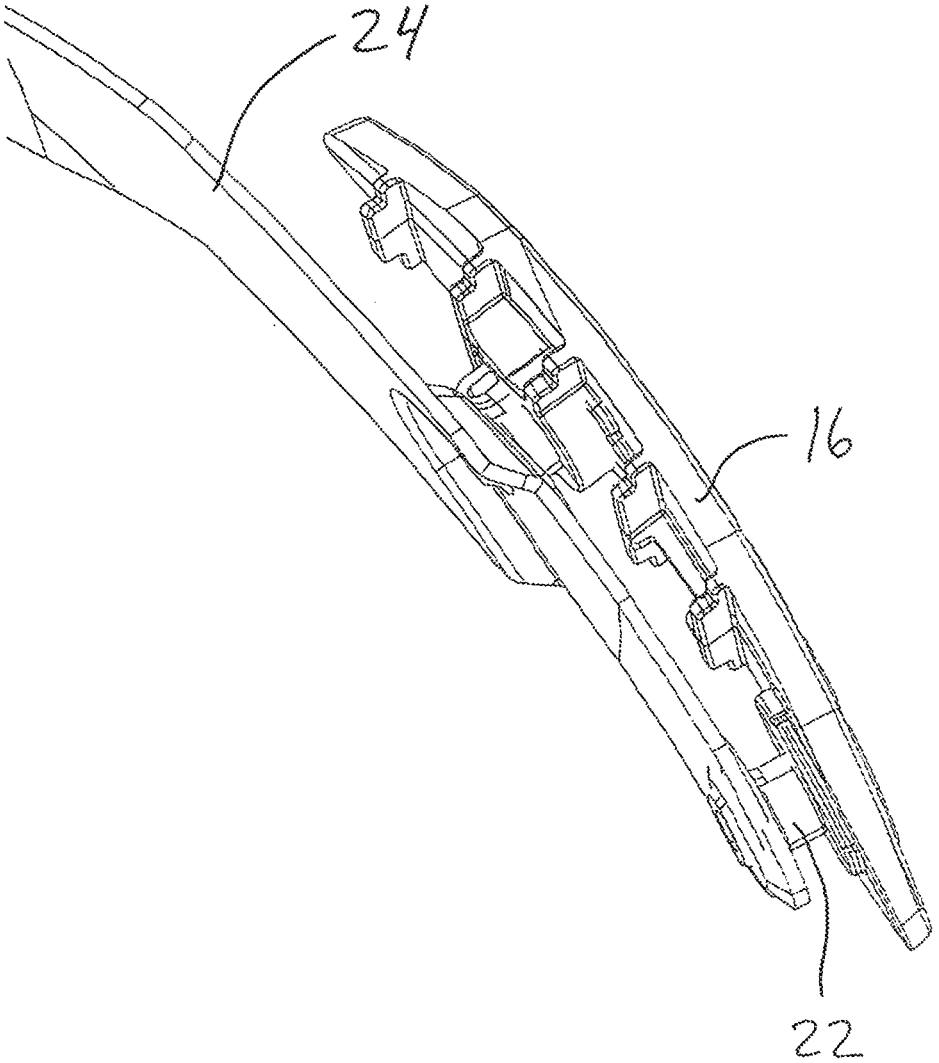
FIG. 7 is a perspective view of the side strap shown in FIG. 6 attached to the side plate shown in FIG. 5 with the other helmet elements removed for clarity.
Figure 8:
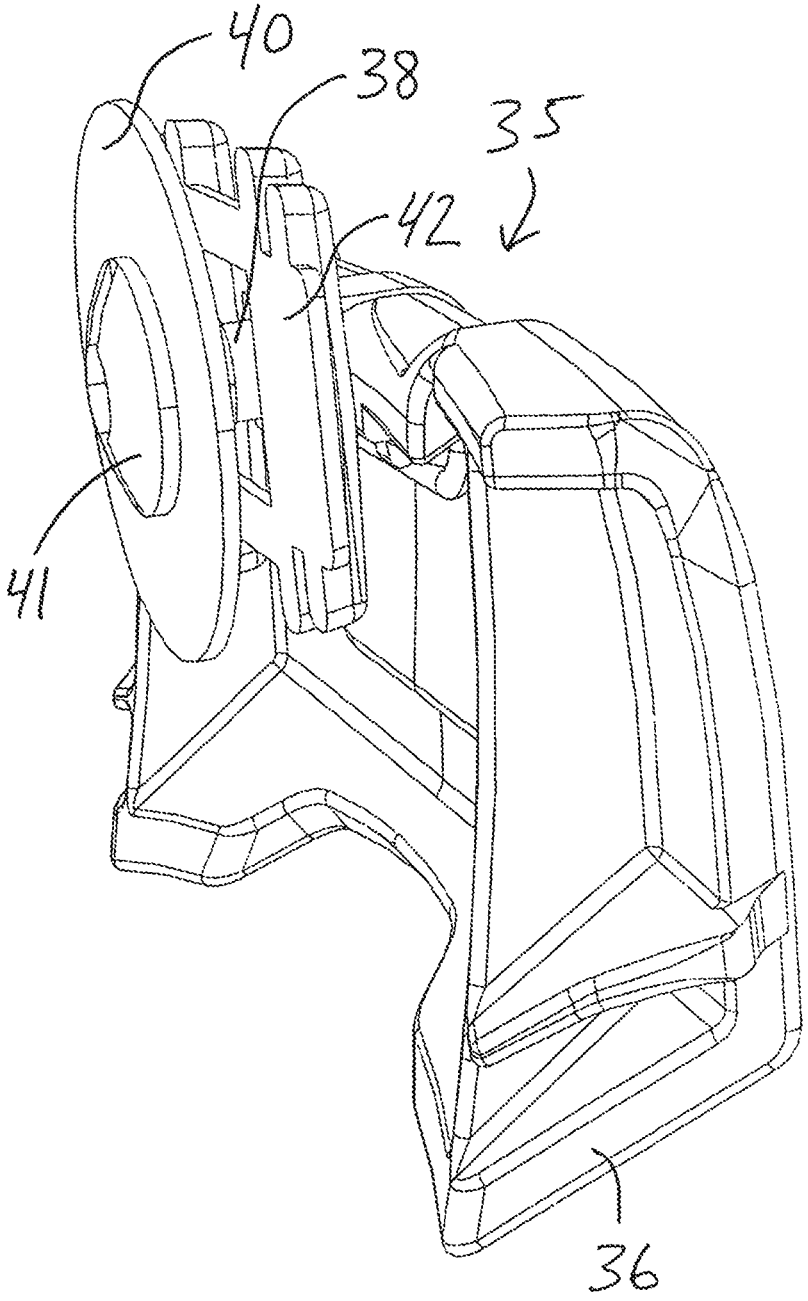
FIG. 8 is a side-perspective view of a cam mechanism included in the helmet shown in FIGS. 1-4.
Figure 9:
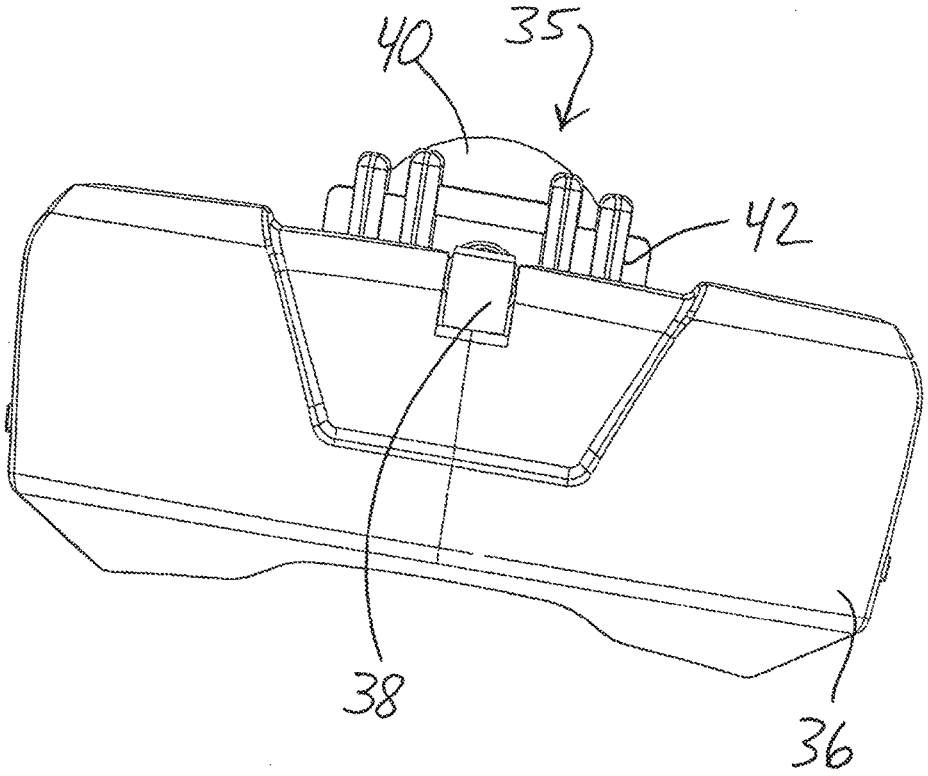
FIG. 9 is a rear perspective view of the cam mechanism shown in FIG. 8.
Figure 10:
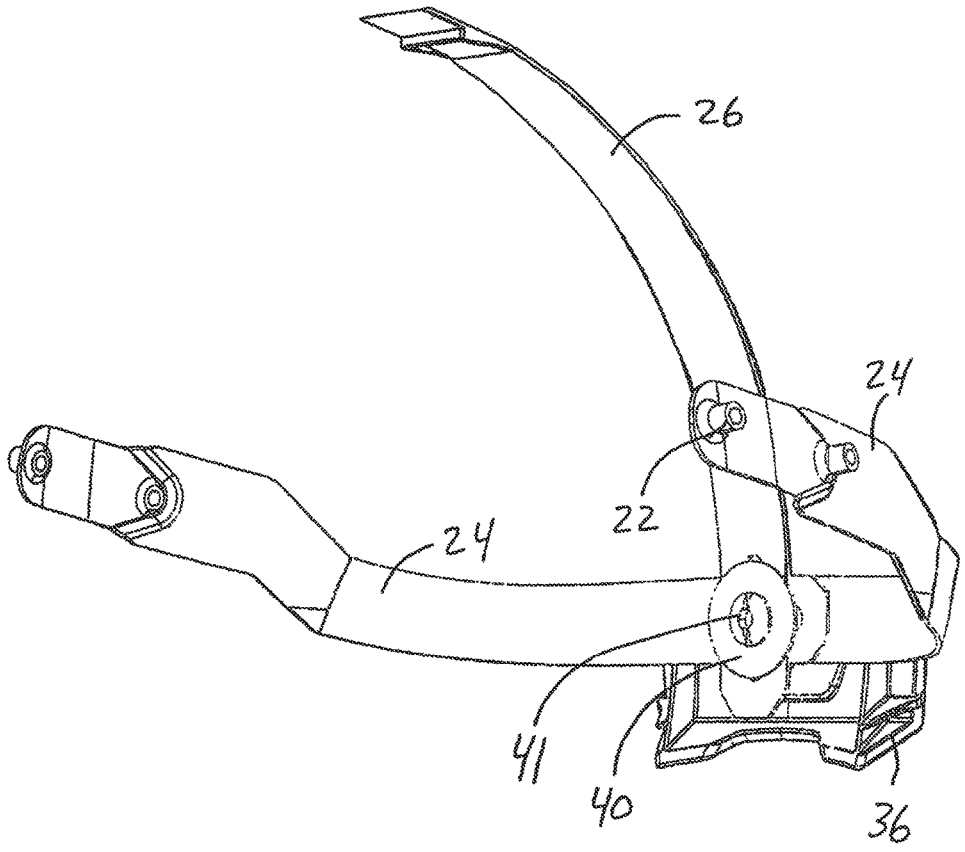
FIG. 10 is a perspective view of the longitudinal adjustment mechanism included in the helmet shown in FIGS. 1-4, including adjustment straps and the cam mechanism shown in FIGS. 8 and 9.
Figure 11:
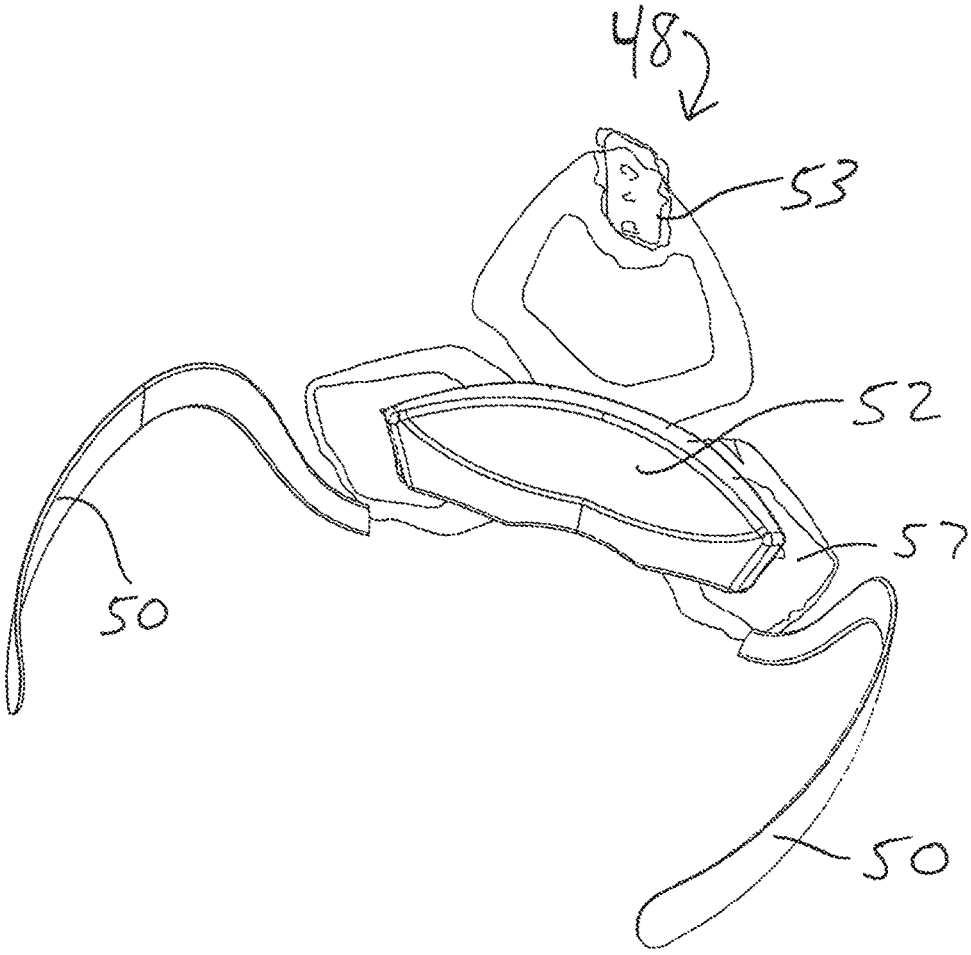
FIG. 11 is a perspective view of a lateral and occipital adjustment system included in the helmet shown in FIGS. 1-4.

The rivets 18 extend through aligned slots or openings 17 in the front and rear shells 12, 14. The rivets 18 are preferably press-fit into female receiving elements 22, which are molded onto or otherwise affixed to substantially rigid side straps 24, shown in FIG. 6, positioned inside the helmet 10. This press-fit relationship, shown in FIG. 7, provides an appropriate tolerance between each side plate 16 and its corresponding side strap 24 to allow the shells 12, 14 (omitted from FIG. 7 for clarity) to be longitudinally adjusted with respect to each other.

Figure 3:
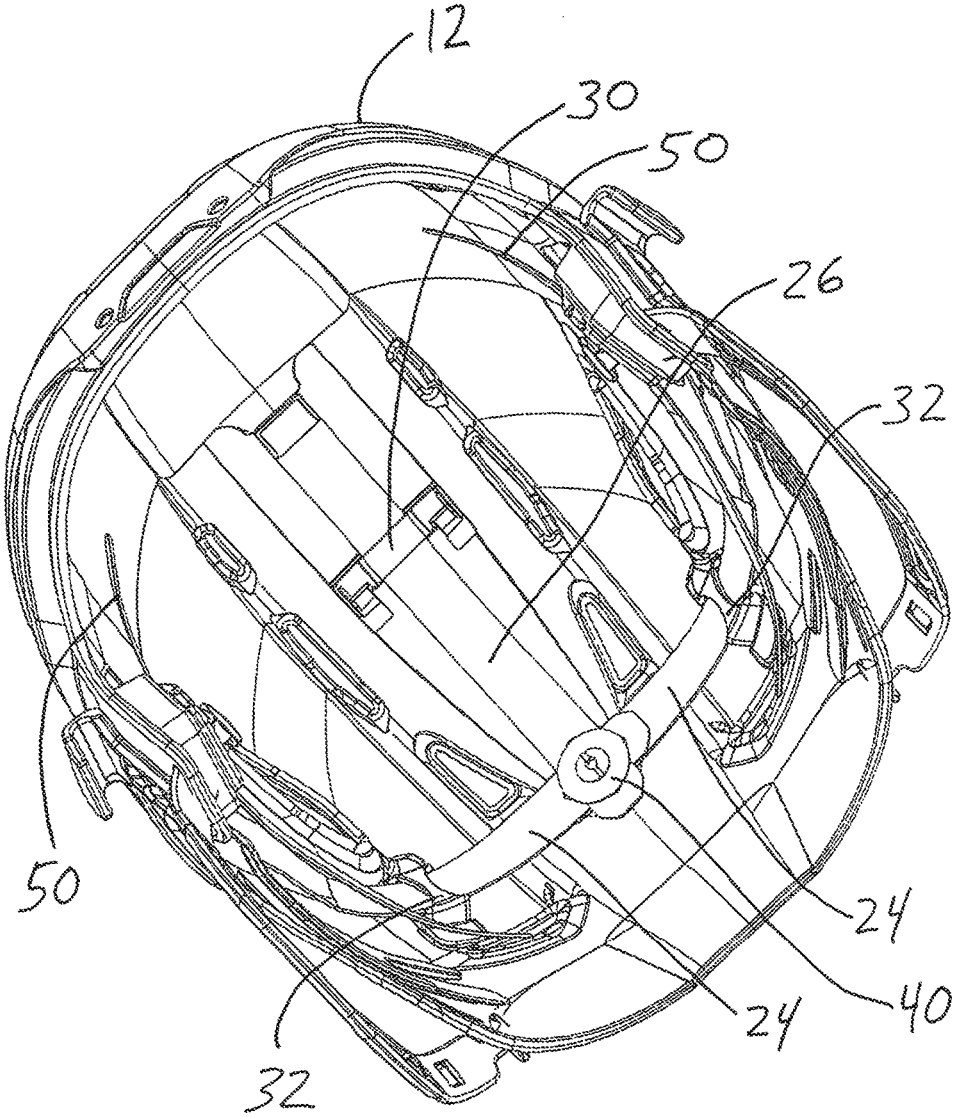
FIG. 3 is an interior perspective view of the helmet shown in FIGS. 1 and 2, with the interior padding removed to reveal elements positioned between the padding and the interior surface of the helmet.

As shown in FIG. 3, the side straps 24 extend into the rear interior of the helmet 10. In one embodiment, an upper strap 26, which is ultrasonically welded or otherwise attached to an upper exterior region of the front shell 12, also extends into the rear interior of the helmet 10. The upper strap 26 is optionally attached to the front shell 12 at a location underneath a front region of the rear shell 14. The side straps 24 and the upper strap 26 may be made of nylon or polyethylene, or of any other material or combination of materials having enough strength or stiffness to prevent longitudinal adjustment of the front and rear shells 12, 14 when the straps 24, 26 are held securely in place inside the helmet 10, as further described below. While two side straps 24 and one upper strap 26 are shown, any other suitable number of straps may be used in the helmet 10. For example, in one embodiment, the upper strap 26 may be omitted such that only the side straps 24 are included.

As shown in FIG. 3, in one embodiment, one or more upper strap sleeves or strap guides 30 are attached to an upper interior surface of the rear shell 14 for guiding the upper strap 26 and maintaining it in a position close to the upper interior surface. The upper strap 26 passes through the upper strap guide 30 toward the rear interior of the helmet 10. Similarly, one or more side strap sleeves or strap guides 32 may be attached to each inner side surface of the rear shell 14 for guiding each of the side straps 24 and maintaining them close to the inner side surfaces. Each side strap 24 passes through its corresponding side strap guide 32 toward the rear interior of the helmet 10. In an alternative embodiment, a lesser or greater number of strap guides may be included, or strap guides may be omitted altogether.

As shown in FIGS. 4 and 8-10, a cam assembly 35 is included at a rear region of the rear shell 14. The cam assembly 35 includes an exterior cam handle 36 attached to a cam post 38. The cam post 38 extends through an opening in the rear shell 14 into the interior of the helmet 10. A cam plate 40 is attached to an end of the cam post 38 via a nut 41 or other suitable connector. Alternatively, the cam plate 40 may be molded or otherwise affixed to the nut 41. A connector with male threads, and a receptor with female threads, may alternatively be used in place of the nut 41 and cam post 38, respectively.

The upper strap 26 and the side straps 24 optionally each include a slot or opening 28 near their free ends. The openings 28 in each of the straps 24, 26 are positioned around the cam post 38 such that the ends of the straps 24, 26 partially overlap one another. A reinforcing plate or shim 42 is optionally positioned around the cam post 38 between the straps 24, 26 and the interior surface of the rear shell 14 to provide a clamping surface for the straps 24, 26, as well as structural support for the cam assembly 35. In one embodiment, the shim 42 is positioned within a recess in the interior surface of the rear shell 14. The shim 42 prevents transmission of excessive compressive force against the interior surface of the rear shell 14, and thus inhibits or prevents permanent compression or "creep" in the rear shell 14. If creep does occur, the nut 41 may be tightened to compensate for the creep.

Figure 4A:
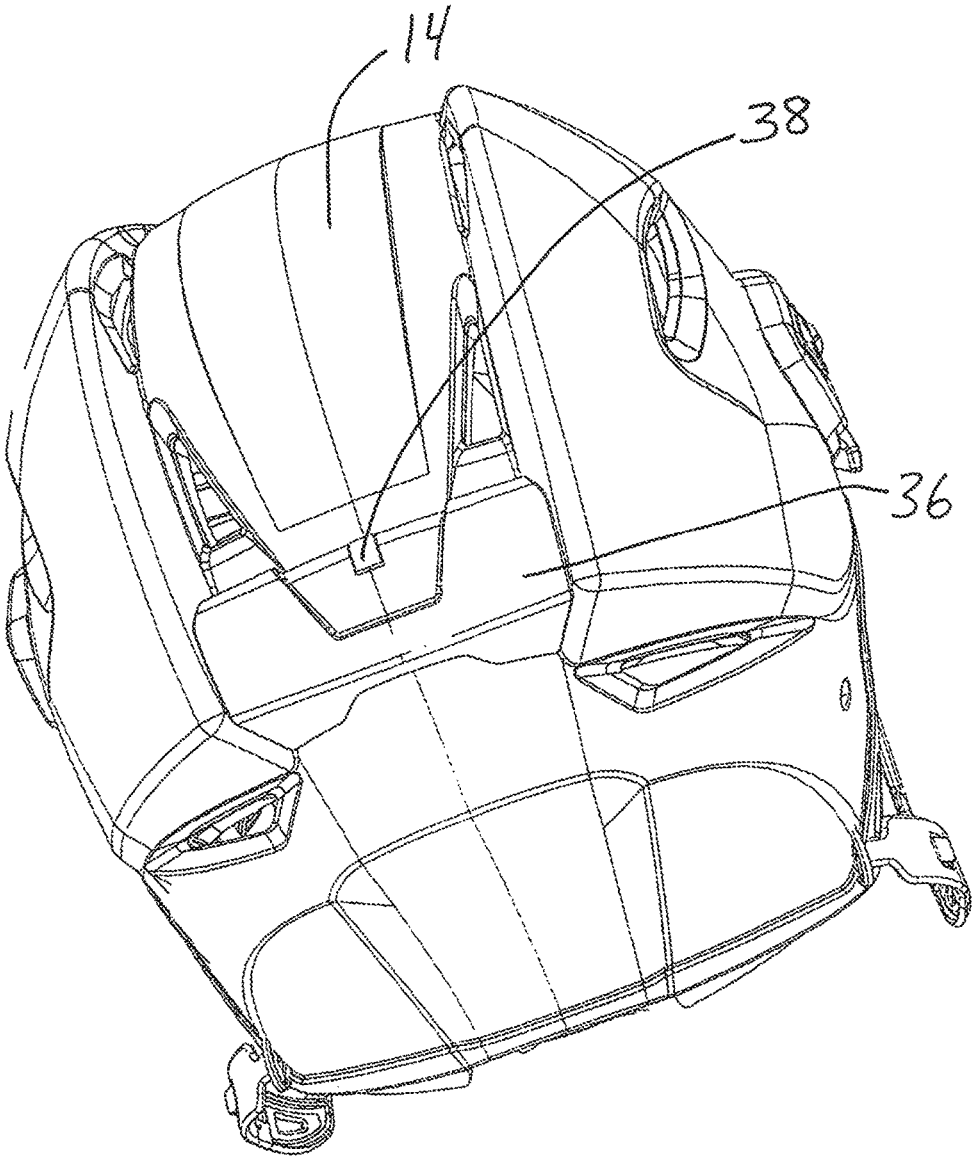
FIG. 4A is a rear perspective view of the helmet shown in FIGS. 1-3 with the cam mechanism in the closed or locked position.
Figure 4B:
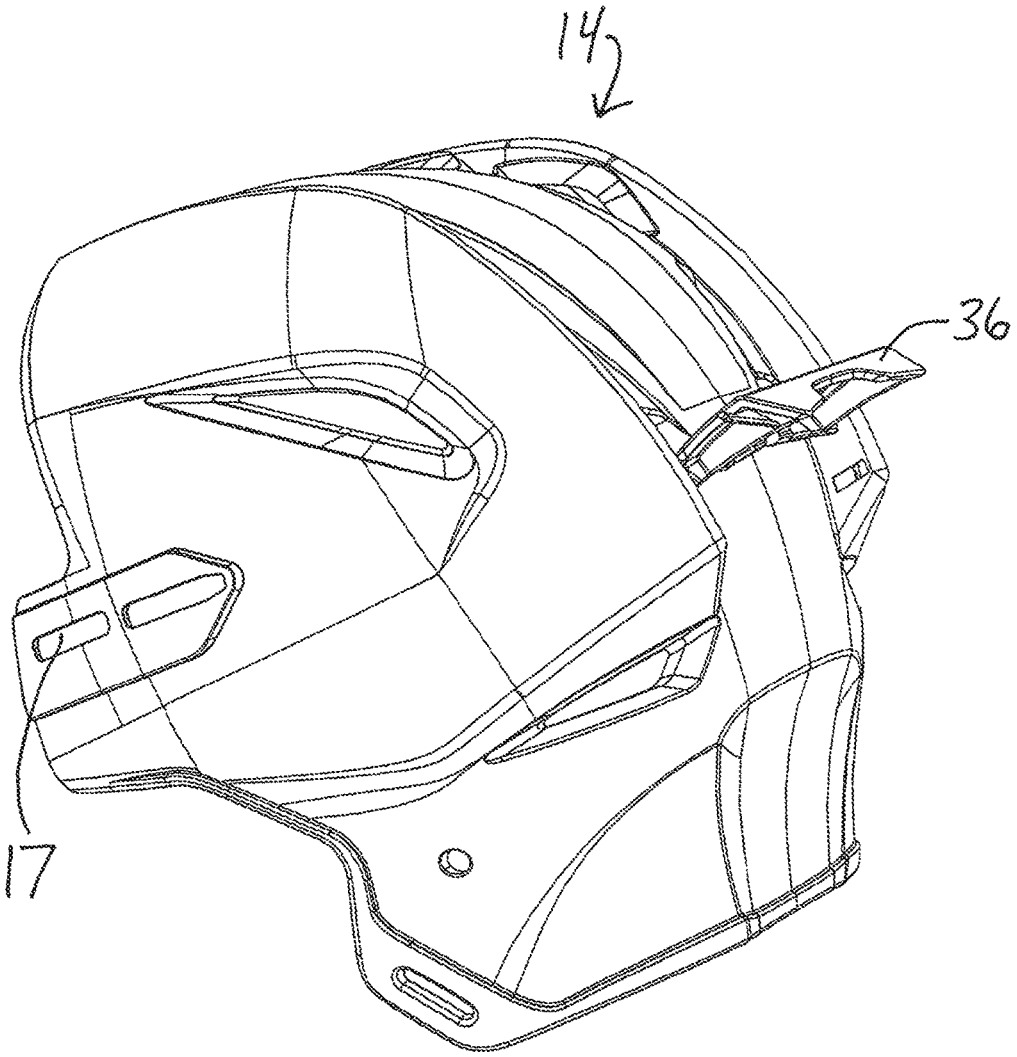
FIG. 4B is a side perspective view of the rear shell of the helmet shown in FIGS. 1-4 with the cam mechanism in the open or unlocked position.

The cam handle 36 is preferably rotatable between an open position in which the cam handle 36 is in a substantially horizontal position extending away from an outer surface of the rear shell 14, as shown in FIG. 4B, and a closed position in which the cam handle 36 is in a substantially vertical position against or adjacent to the outer surface of the rear shell 14, as shown in FIGS. 4A and 8-10. When in the open position, the cam handle 36 urges the cam post 38 toward the interior of the helmet 10, pushing the cam plate 40 away from the straps 24, 26 so that they are free to move or slide about the cam post 38. When in the closed position, the cam handle 36 urges the cam post 38 toward the rear of the helmet 10, pulling the cam plate 40 against the straps 24, 26. In this closed position, the cam plate 40 presses the straps 24, 26 against the shim 42 (or against the interior surface of the rear shell 14 if the shim 42 is omitted) so that they are prevented from moving or sliding about the cam post 38.

When the cam assembly 35 is in the open position, the length of the helmet 10 may be adjusted by pushing the front and rear shells 12, 14 toward each other or by pulling them away from each other. During this adjustment, the straps 24, 26 are guided via their respective strap guides 30, 32, while their openings 28 slide or move about the cam post 38. After the helmet 10 is adjusted to a desired length, the cam handle 36 may be rotated into the closed position to secure the side straps 24 and the upper strap 26 against the shim 42 (or against the interior surface of the rear shell 14 if a shim 42 is omitted). When in the closed position, the rigidity or stiffness of the straps 24, 26 prevents further longitudinal adjustment of the helmet 10.

This single-cam system allows for faster length adjustment than the multi-cam or multi-screw systems used in many existing helmets. Furthermore, a snug fit can more readily be achieved when the helmet 10 is positioned on a wearer's head, since the wearer can use one hand to adjust and hold the helmet in place, while using the other hand to close the cam handle 36 to secure the helmet 10 in place.

In an alternative embodiment, single-screw side plates may be used to provide longitudinal helmet adjustment, instead of the strap-based, cam-lock system described above. In this embodiment, each side plate includes one insert-molded rivet on its inner surface, and an opening through which a screw or bolt may be threaded (instead of including a second rivet). In the closed or locked position, the screw or bolt is threaded through the opening in the side plate, through the front shell 12, and into a threaded receiving element in the rear shell 14. Alternatively, the side plate may be omitted and the screw or bolt may be threaded directly through the front shell 12 into the threaded receiving element in the rear shell 14.

To adjust the helmet's length, a user loosens or partially unthreads the single screw in each side plate, which allows the front and rear shells 12, 14 to be longitudinally adjusted relative to each other. Once a desired length is achieved, the user tightens the single screw in each side plate to secure the front and rear shells 12, 14 to each other, thus preventing longitudinal movement between them. Many existing adjustable helmets, conversely, typically include two screws in each side plate (or in the helmet shells on each side of the helmet), and therefore require more time and effort to perform length adjustments.

In a related embodiment, the single screw may be replaced with a wing-nut, which may be loosened and tightened by hand. The wing-nut may include a folding or pivoting flap, which, when pivoted to the closed position, abuts or is adjacent to the helmet's surface. When the flap is pivoted to the open position, it provides enough surface area for a user to twist the wing-nut and unthread it from the receiving element in the rear shell 14. Thus, including a wing-nut instead of a standard screw obviates the need for a screwdriver when adjusting the helmet's length.

In one embodiment, as shown in FIGS. 2, 3, 11, and 12, the helmet 10 may additionally or alternatively include a lateral and occipital adjustment system 48 configured to engage the sides and back of a wearer's head or the nape of the wearer's neck. The lateral and occipital adjustment system 48 includes one or more bands 50 or straps attached or affixed to the padding 15 (or to the front shell 12) in the front interior region of the helmet 10, via screws, snaps, or any other suitable connectors. The bands 50 or straps are preferably made of a relatively flexible plastic, nylon, or other suitable material.

The bands 50 or straps may be tightened or loosened, such that they are displaced laterally toward or away from the central interior of the helmet 10, via a dial in a dial housing 52, a knob, or another device located at a rear of the helmet 10. The lateral and occipital adjustment system 48 also preferably includes an upper attachment portion 53 that may be attached to the liner padding 15, or to the rear shell 14, or to a separate attachment element 55 (see FIG. 2), via screws, snaps, or any other suitable connectors. An occipital pad 57 or similar element is preferably attached to the dial 52, the straps 50, or the attachment portion 53 for engaging the rear of a wearer's head or the nape of the wearer's neck. Any other suitable lateral and occipital adjustment system may alternatively be used in the helmet 10.

Figure 12:
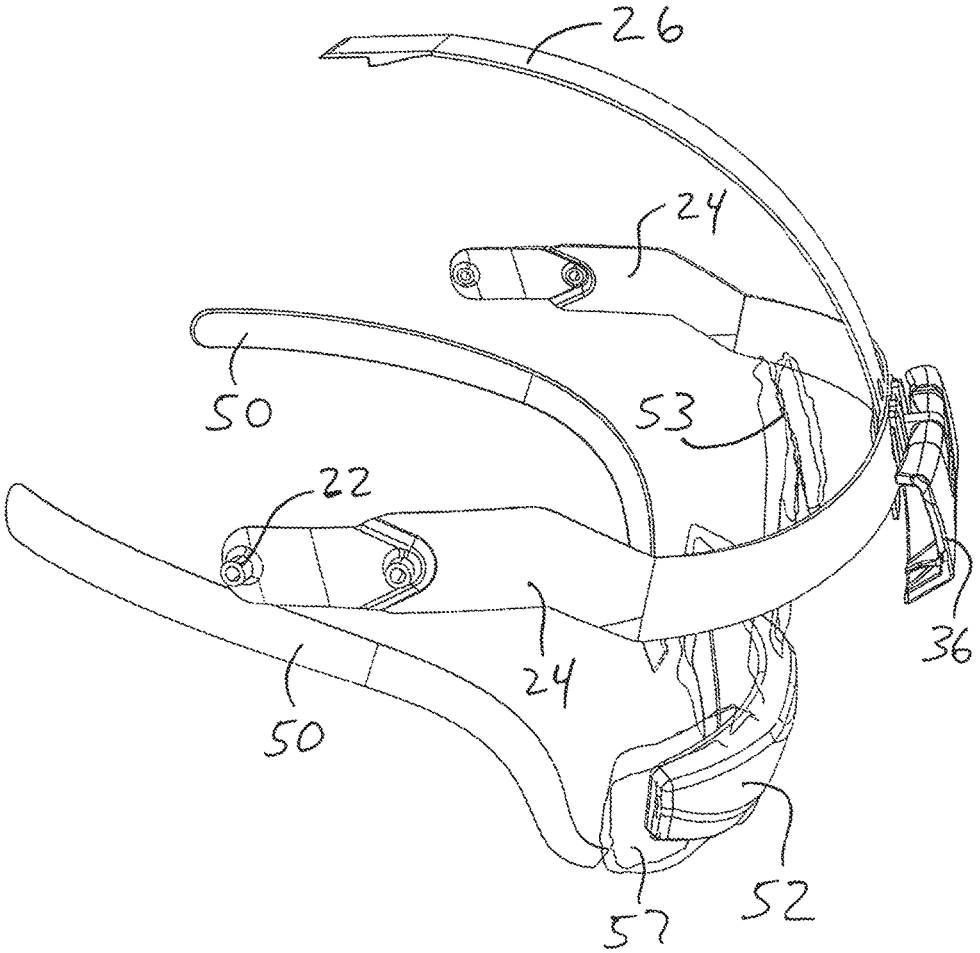
FIG. 12 is a perspective view of the longitudinal, lateral, and occipital adjustment systems included in the helmet shown in FIGS. 1-4.

The adjustable helmet 10 may include one or more of the longitudinal, lateral, and occipital adjustment systems described above. FIG. 12 shows the general spatial relationship between the longitudinal, lateral, and occipital adjustment systems when all are included in a helmet 10, according to one embodiment. Variations may of course be made to the relative spacing and orientation of the various adjustment systems.

In an alternative embodiment, the various adjustment systems may be integrated with one another. For example, the longitudinal and lateral adjustment systems may be operable via a single knob and cam system. In such a system, the knob may first be rotated to adjust the longitudinal length of the front and rear shells 12, 14. The cam mechanism may then be moved into the locked position, after which the knob may be turned to adjust the lateral bands of the system. The reverse of this system, in which the lateral bands are adjusted when the cam is in the unlocked position, may alternatively be used. These integrated adjustment systems may be accomplished using gears associated with the cam system or using another suitable switching mechanism.

Figure 13:
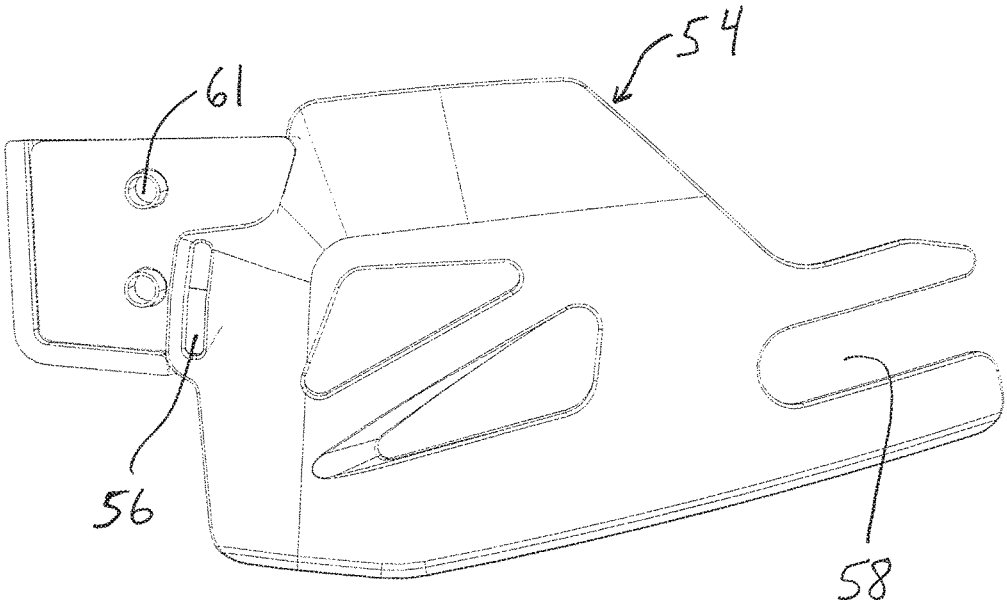
FIG. 13 is a perspective view of a height-adjustable earpiece and a clamping plate included in the helmet shown in FIGS. 1-4.

One or more of the following additional features may optionally be included in the adjustable helmet 10. As shown in FIGS. 1 and 13, height-adjustable earpieces 54 may be included to allow a wearer to adjust the vertical position of the earpieces 54 on the helmet 10. An opening 56 in each earpiece is preferably positioned over a raised projection (not visible in the drawings) on an interior surface of the front shell 12. A clamping plate 59 or similar structure, which may be a molded foam or similar material, includes threaded receiving elements 61 or other receiving elements. The clamping plate 59 is positioned behind (i.e., toward the interior of the helmet 10) the earpiece 54 to provide a clamping force on the earpiece 54 when one or more screws or other suitable connectors are threaded into the receiving elements 61.

The rear region of the earpiece 54 is sandwiched between the inner surface of the rear shell 14 and the liner padding 15. The rear region of the earpiece 54 includes a slot 58 or opening that is positioned around a post-screw assembly (not visible in the drawings) used to attach the liner padding 15 to the rear shell 14. The post-screw assembly provides a point of rotation for the earpiece 54. To adjust the height of the earpiece 54, a user loosens the screws in the receiving elements 61, causing the clamping plate to release its clamping force on the earpiece 54. The user then rotates the front region of the earpiece 54 to a desired height, after which the user tightens the screws to secure the earpiece 54 at the desired height. The raised projection positioned in the opening 56 limits the vertical movement of the earpiece 54 in the upward and downward directions by engaging the upper or lower surfaces that define the upper and lower regions of the opening 56.

Figure 14:
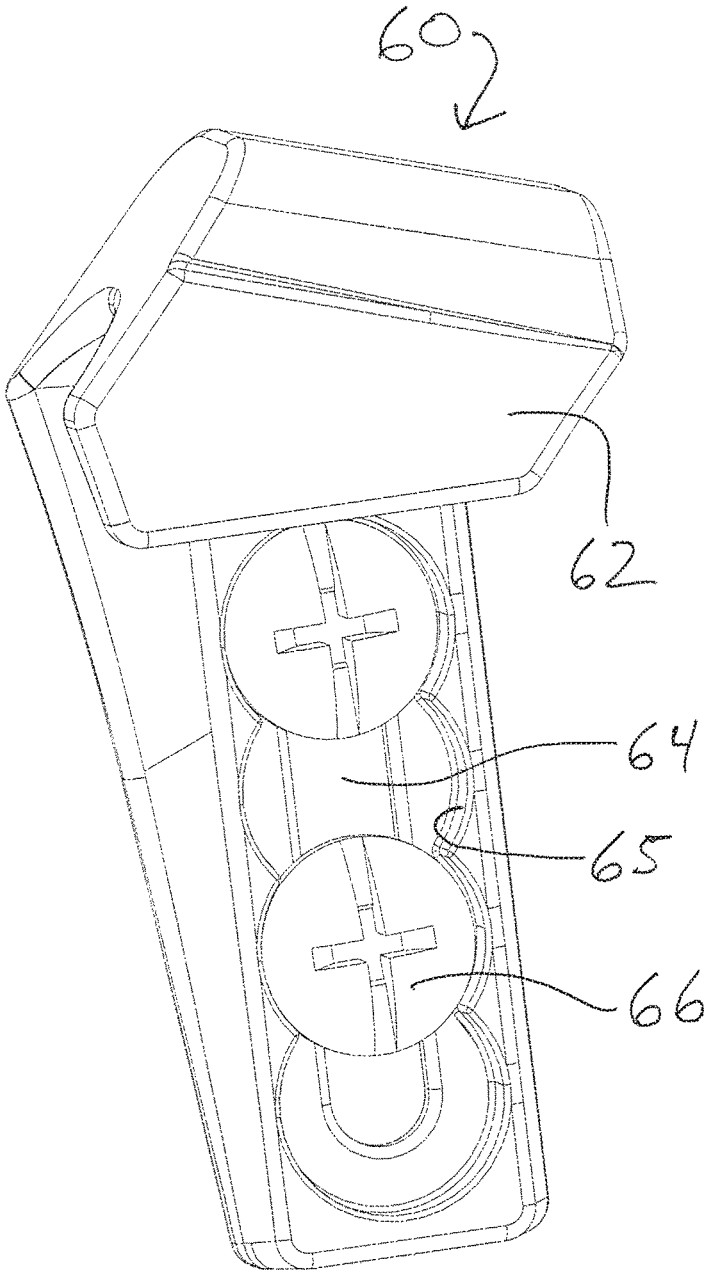
FIG. 14 is a perspective view of a height-adjustable J-clip included in the helmet shown in FIGS. 1-4.

As shown in FIGS. 1 and 14, height-adjustable J-clips 60 may optionally be included at the temple regions of the front shell 12. Each J-clip 60 includes a hooded arm 62 or similar device for preventing an optional face protector from over-rotating into a wearer's face during impact with a puck or other object. The J-clip includes a slot 64 about which four substantially circular regions, which are defined by ridges 65, are longitudinally arranged for receiving two screws 66 or similar connectors (or any other suitable number of screws or connectors) that are threaded into openings in the front shell 12. A user may adjust the vertical height of the J-clip 60 relative to the front shell 12 by partially loosening the screws 66 until the heads of the screws 66 move beyond the ridges 65. The user then slides the J-clip 60 into the desired vertical position, after which the user re-tightens the screws 66.

A conventional J-clip, conversely, includes four round holes into which two screws may be threaded, allowing the J-clip to be moved between the high and low positions. To move a conventional J-clip between these two positions, however, the two screws must be completely removed from the helmet shell, then re-inserted and re-tightened once the J-clip's position has been adjusted. Thus, the slotted configuration shown in FIGS. 1 and 14 allows for more efficient adjustment of the J-clip 60.

In an alternative embodiment, the recessed slot may include longitudinal ridges instead of ridges 65 that define substantially circular regions. In such an embodiment, the screws 66 must be adequately tightened to prevent vertical movement of the J-clip 60 without the aid of the circular regions. In another alternative embodiment, a horizontal divider, which divides the slot 64 into two separate vertical slotted regions, may be included to provide additional strength to the J-clip 60.

Figure 15:
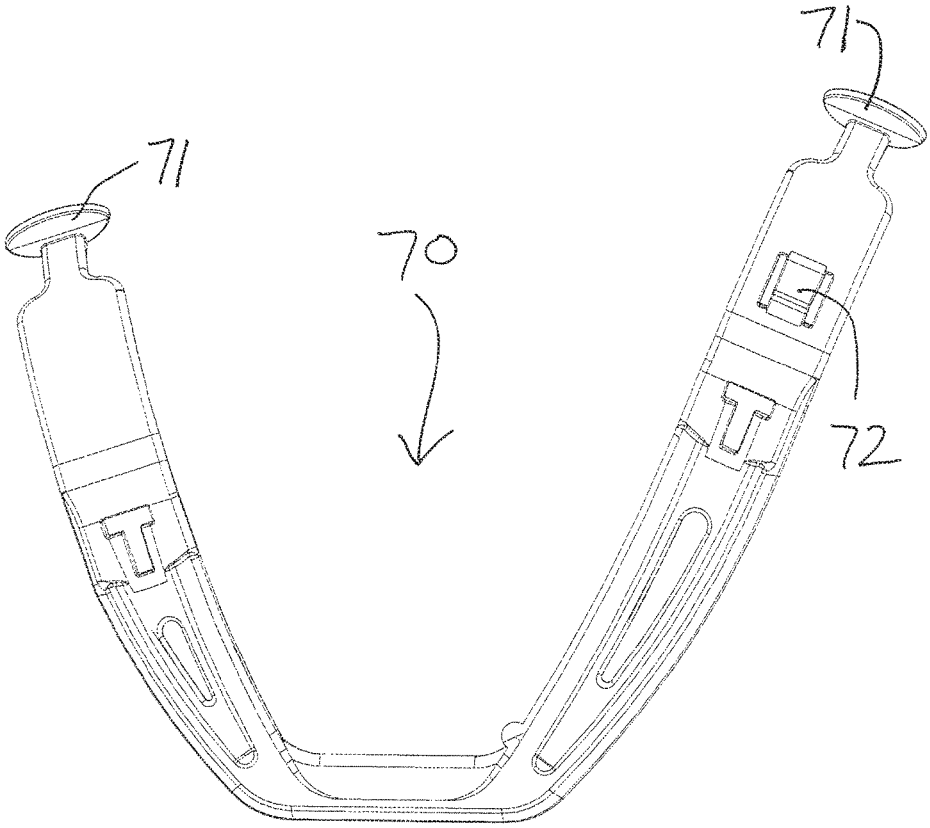
FIG. 15 is a perspective view of an ear-loop included in the helmet shown in FIGS. 1-4.

As shown in FIGS. 1 and 15, ear-loops 70 are preferably attached to the front and rear shells 12, 14 on each side of the helmet 10. The ear-loops 70 include enlarged end portions 71 that are insertable through slots or openings in the front and rear shells 12, 14 for securing the ear-loops 70 to the helmet 10. The rear portion (or front portion) of each ear-loop 70 includes a raised ledge 72, bead, or similar feature that snaps into or squeezes through the slot in the rear shell 14 (or the front shell 12) when the ear-loop 70 is rotated into an up position, thus maintaining the ear-loop 70 in an up position. Players often like to flip up their ear-loops during warm-ups and in between periods. Conventional ear-loops, however, typically do not remain in the up position because they do not include a mechanism for maintaining the ear-loop in the up position.

Figure 16:
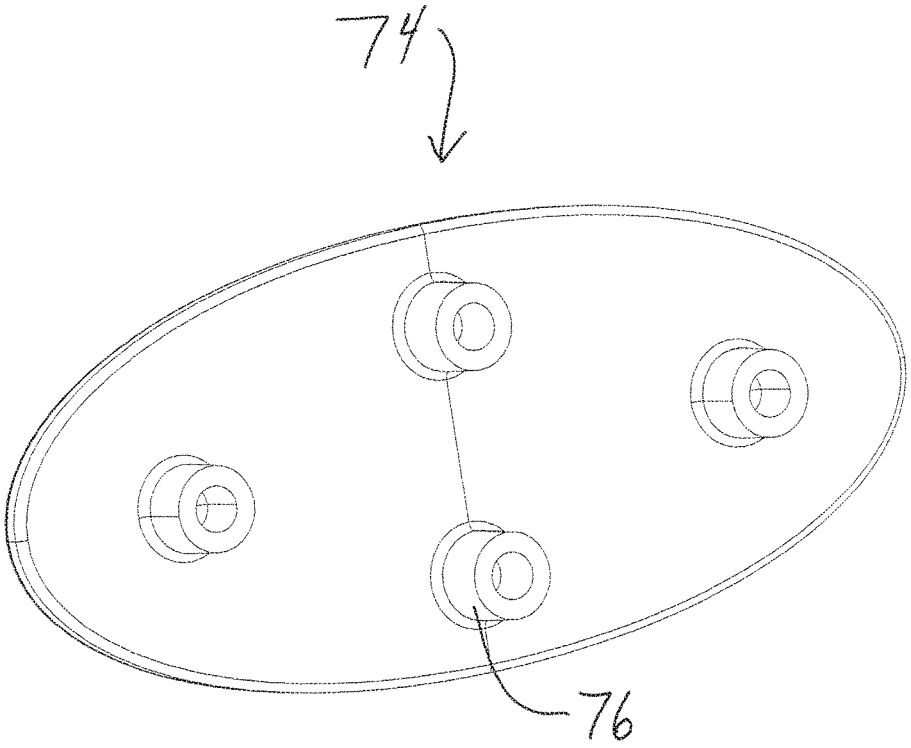
FIG. 16 is a perspective view of an interior region of a front plate included in the helmet shown in FIGS. 1-4.

As shown in FIGS. 1 and 16, a front plate 74, which may be made of a nylon material or other similar material, includes a plurality of posts 76 injection-molded or otherwise integrated onto its rear surface. The front-facing region of the front shell 12 includes a recessed area including corresponding openings into which the posts 76 may be inserted. The posts 76 are optionally heat-staked into the openings to permanently attach them to the front shell 12. A bubble logo or other decorative element may be adhered or otherwise affixed to the front surface of the front plate 74. Because the front surface of the front plate 74 is made of a nylon or similar material, as opposed to polyethylene, the logo or decorative element can be securely glued to the front plate 74.

Figure 17A:
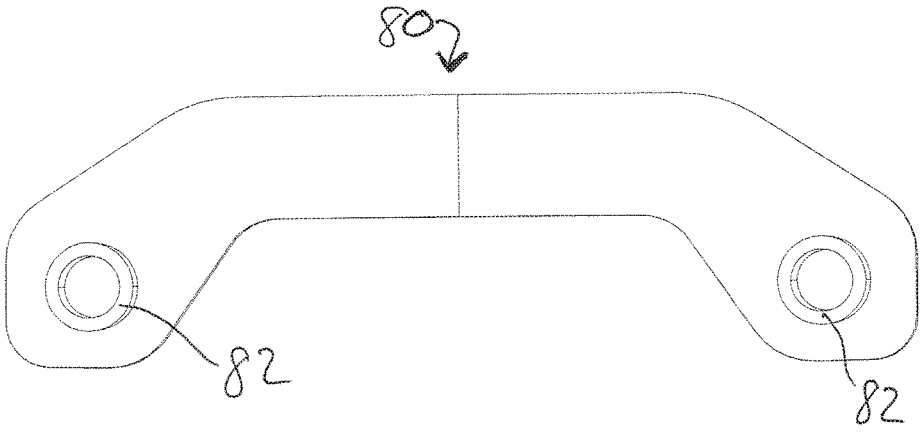
FIG. 17A is a perspective view of one embodiment of a front screw-plate that may be included in the helmet shown in FIGS. 1-4.

As shown in FIGS. 1 and 17A, a front screw-plate 80 may be included for securing the front shell 12 to the liner padding 15. The screw-plate 80 includes two circular, threaded receiving elements 82 molded on or otherwise integrated thereon. The front shell 12 includes two circular openings in which the receiving elements 82 are positioned.

The screw-plate 80 is directly or indirectly affixed to a portion of the front liner padding 15. In one embodiment, a stiff fabric material is sandwiched between the screw plate 80 and the interior surface of the front shell 12. The stiff fabric material has a greater surface area than, and therefore extends beyond the boundaries of, the screw plate 80. The liner padding 15 may be adhered or otherwise affixed to the stiff fabric material. Screws 78 or bolts are threaded from the exterior of the front shell 12 into the receiving elements 82 to secure the fabric material between the front shell 12 and the screw-plate 80.

Figure 17B:
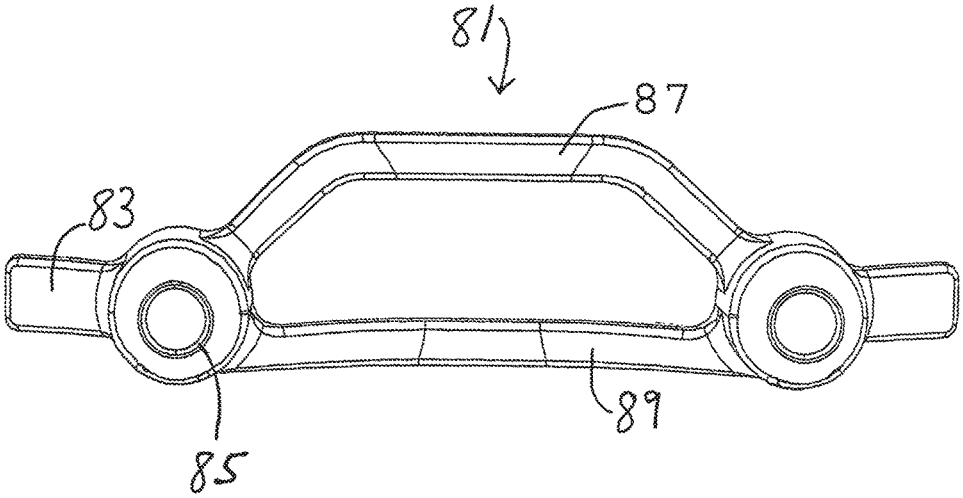
FIG. 17B is a perspective view of an alternative embodiment of a front screw-plate that may be included in the helmet shown in FIGS. 1-4.

FIG. 17B illustrates an alternative embodiment of a screw plate 81 including lateral flanges 83 positioned adjacent to two circular, threaded receiving elements 85. The screw plate 81 may be a unitary piece or may include one or more support arms, such as the upper support arm 87 and the lower support arm 89 shown in FIG. 17B. The screw plate 81 is preferably embedded within a front region of the liner padding 15. The receiving elements 85 protrude out of the liner padding 15 and are positioned in the circular openings in the front shell 12 for receiving the screws 78 or bolts.

During threading of the screws 78 or bolts, the receiving elements 82 or 85 are prevented from rotating due to their connection via the screw-plate 80 or 81 in conjunction with their positioning in the shell openings. Many existing helmets, conversely, use individual, non-circular receiving elements that fit into non-circular holes in the helmet shell. The receiving elements are non-circular to prevent them from rotating within the shell openings when screws or bolts are threaded into the non-circular receiving elements. Thus, by incorporating a single, integrated screw-plate 80 or 81, circular receiving elements 82 or 85 may be used to secure the front shell 12 to the liner padding 15.

Figure 18:
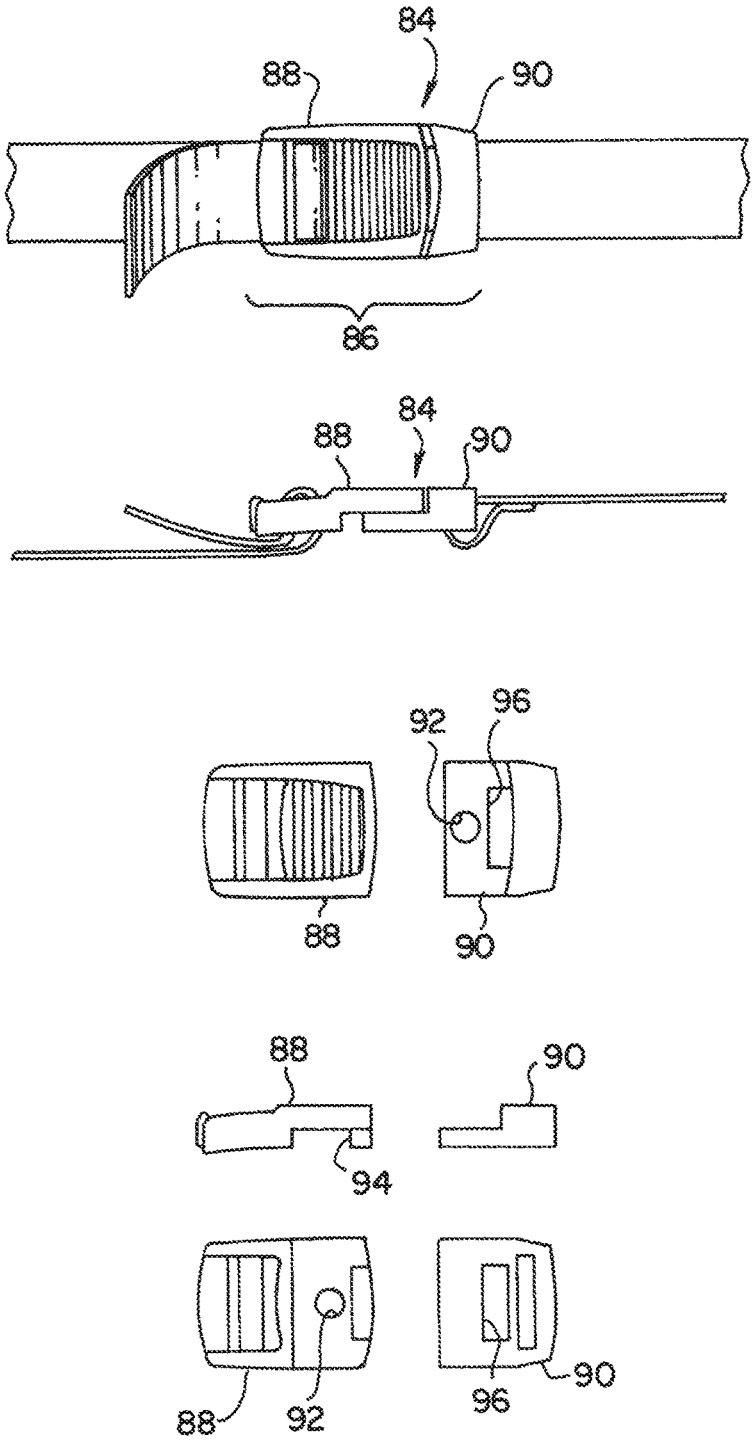
FIG. 18 includes multiple perspective views of a magnetic buckle optionally included on the helmet shown in FIGS. 1-4.

As shown in FIG. 18, a chin strap 84, which may be attached at its free ends to the ear-loops 70 or to other suitable helmet regions, includes a magnetic buckle 86. The buckle 86 includes a first component 88 and a second component 90, each including a magnet 92 insert-molded thereon or otherwise affixed thereto.

The first and second components 88, 90 preferably include first and second walls 94, 96, respectively, each oriented substantially perpendicularly to the face onto which its respective magnet 92 is molded. The first and second walls 94, 96 engage each other when the first and second components 88, 90 are magnetically coupled to each other. This wall arrangement prevents the first and second 88, 90 components from readily disengaging from each other when the chin-strap is pulled in tension. The first and second walls 94, 96, in conjunction with the magnets 92, are optionally configured in a manner that allows the first and second components 88, 90 to disengage from each other when a predetermined amount of tensile force is applied to the chin strap 84. The magnetic buckle 86 is substantially easier to connect and disconnect than are traditional snap-fit arrangements.

Figure 19:
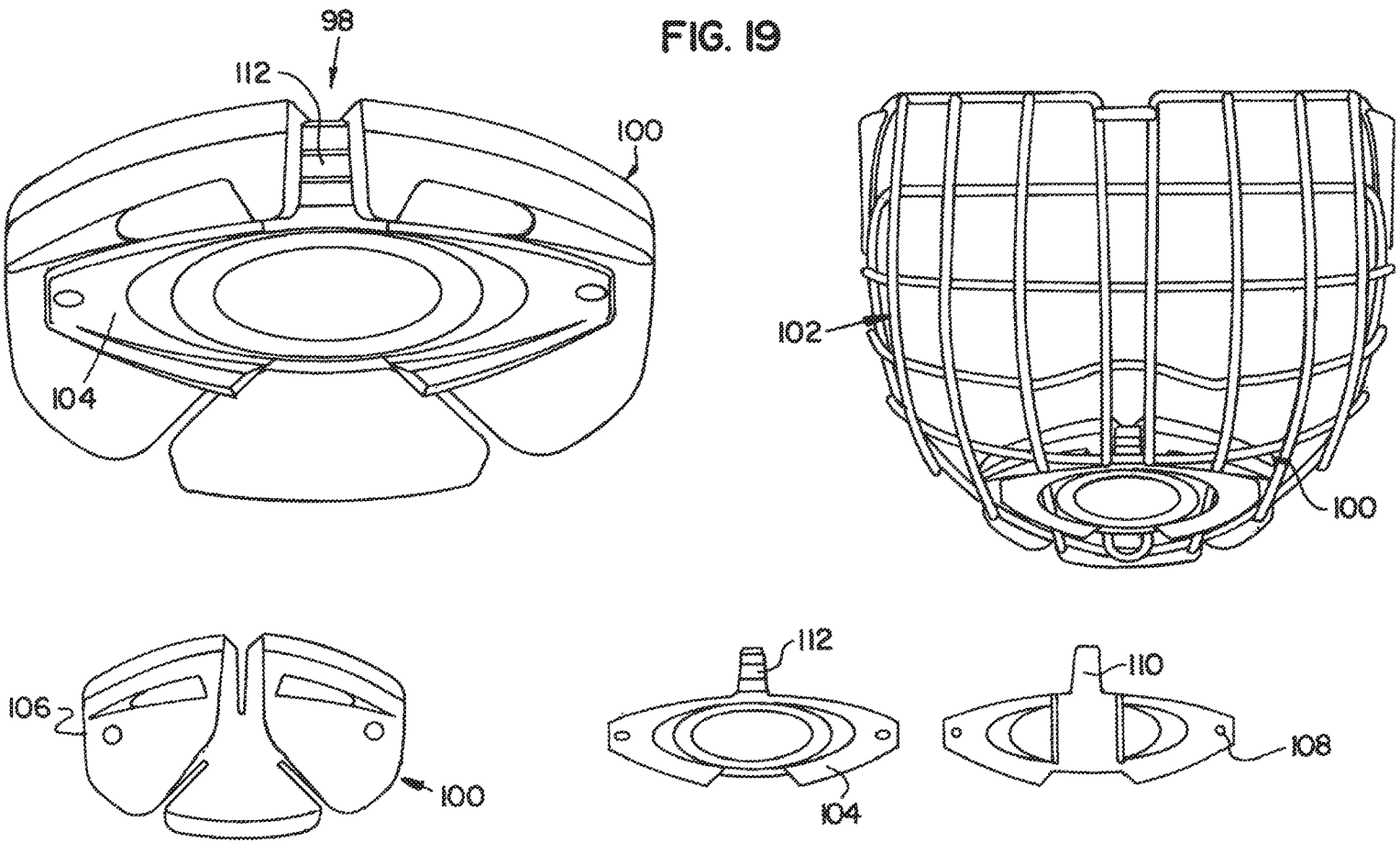
FIG. 19 includes multiple perspective views of a wire facemask and height-adjustable chin cup optionally included on the helmet shown in FIGS. 1-4.

As shown in FIG. 19, a chin-cup assembly 98 for use on an optional wire cage facemask 102 includes a chin cup 100 and a chin cup retainer 104. The chin cup 100 may be injection-molded, compression-molded, or otherwise formed, and optionally includes female receiving elements 106 molded therein. The retainer 104 optionally includes corresponding insert-molded male snaps 108 or rivets (the male and female elements could of course be reversed). The chin cup 100 and the retainer 104 may be press-fit together or otherwise attached to each other around the wires of the facemask 102.

An integral, vertically extending indexing arm 110 is optionally included on the retainer 104. The indexing arm 110 includes horizontal grooves 112 that can snap over the horizontal wires on the facemask 102. To adjust the height of the chin cup 100, a user slides the chin cup assembly 98 to a desired height on the facemask 102, allowing a wire to snap into one of the horizontal grooves 112. Thus, the chin cup assembly 98 can be secured in a desired location, and does not have to be removed from the facemask 102 to have its vertical position adjusted on the facemask 102.

Figure 20:
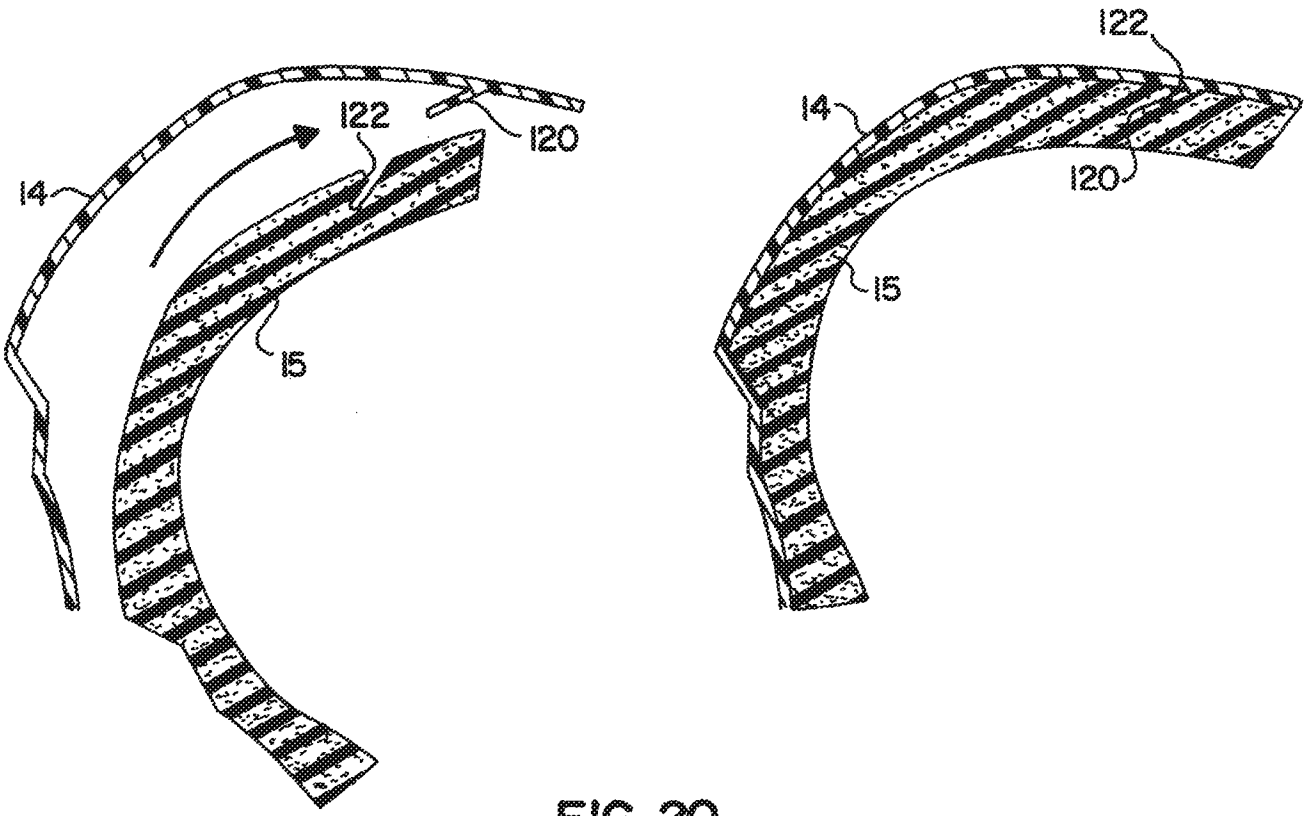
FIG. 20 includes multiple sectional views of a locking tab optionally included in the helmet shown in FIGS. 1-4.

As shown in FIG. 20, a substantially rear-projecting tab 120 or similar element may be included on the interior surface of the rear shell 14 for engaging a corresponding slot 122 in the liner padding 15. The tab 120 substantially prevents the padding 15 from rotating in a forward direction, which is often an issue with existing helmets. In an alternative embodiment, the tab 120 may be included on the upper strap guide 30, which is secured to the upper interior surface of the rear shell 14.

Figure 21:
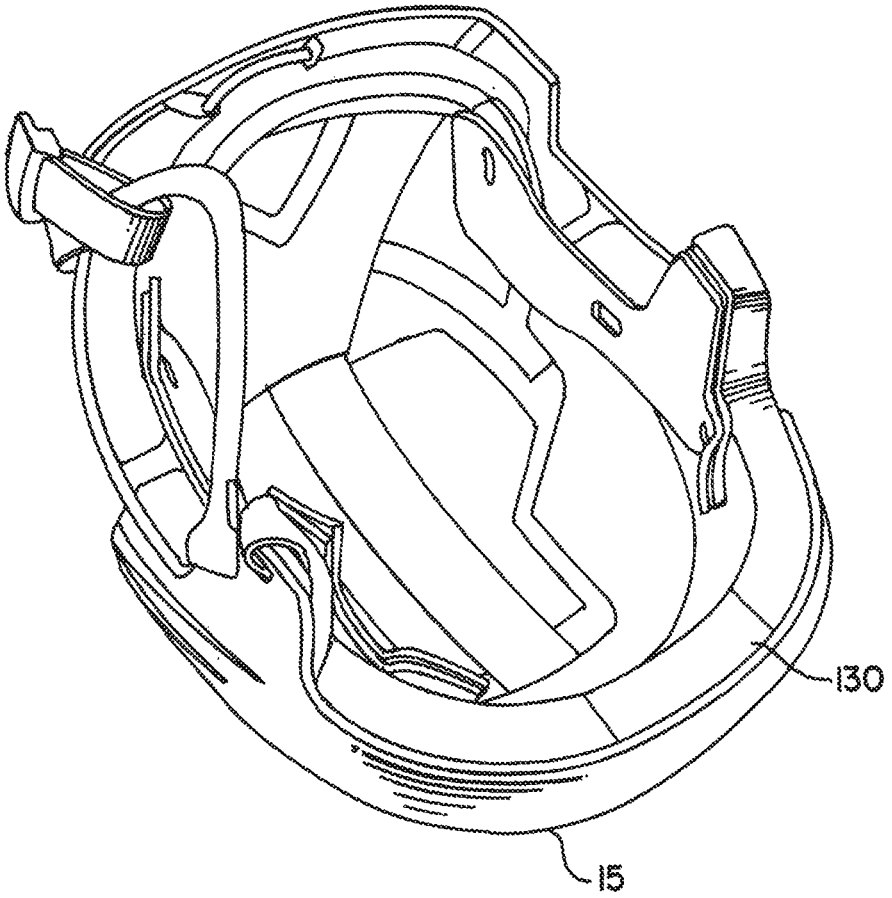
FIG. 21 is a perspective view of a comfort nose-pad optionally included in the helmet shown in FIGS. 1-4.

As shown in FIG. 21, a comfort pad 130 made of a soft foam or other soft material may be included at the front of the helmet 10 to provide a soft engagement surface, when the helmet is rotated forward, for a wearer's nose. A channel is optionally created in the lower front edge of the liner padding 15 for receiving the comfort pad 130, which may be adhered or otherwise affixed to the liner padding or to the front shell 12.

Figure 22:
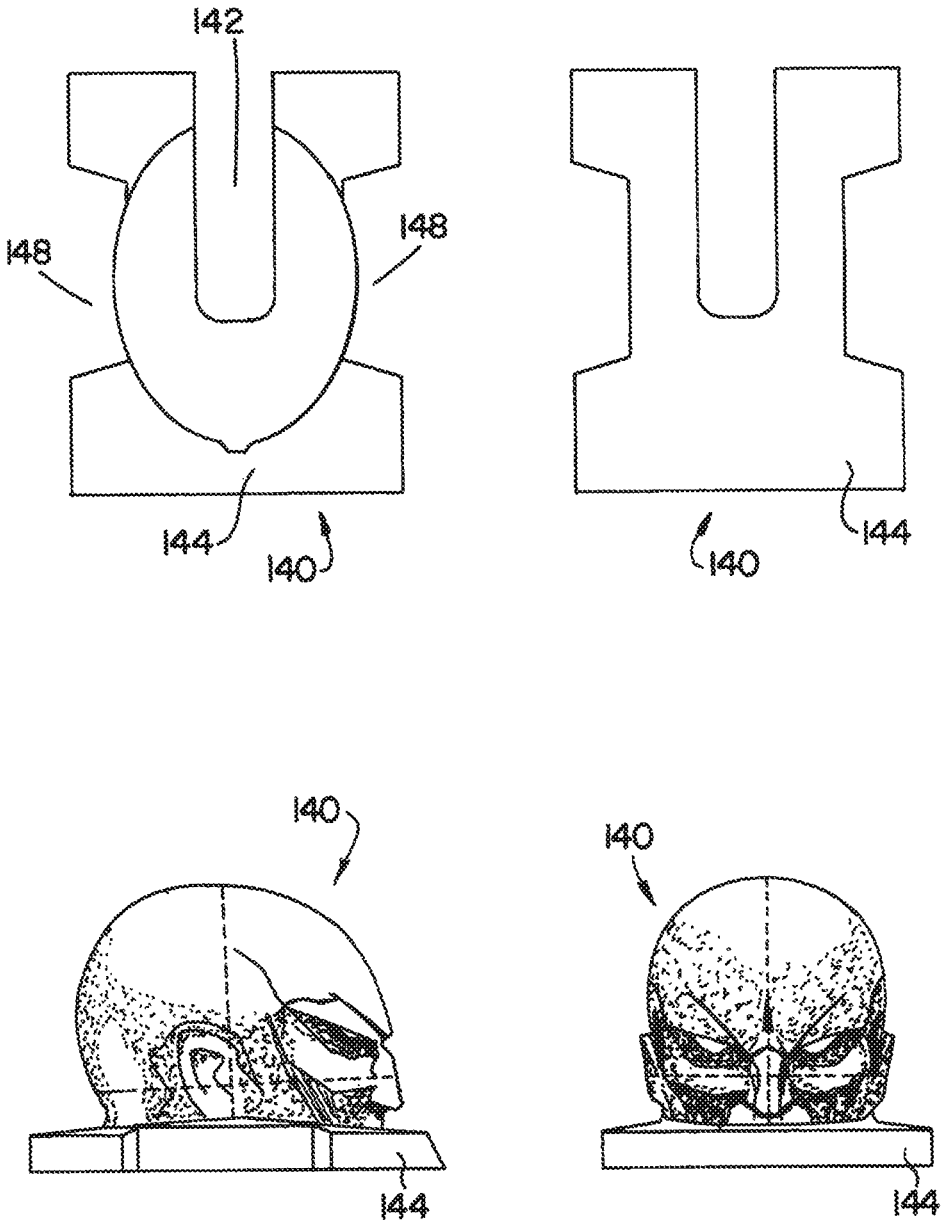
FIG. 22 includes multiple views of a head-form optionally included in helmet packaging.
Figure 23:
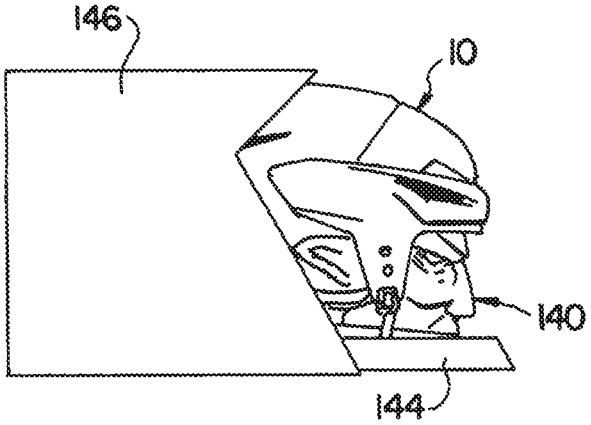
FIG. 23 includes multiple views of a helmet packaging assembly, including the head-form shown in FIG. 22.

As shown in FIGS. 22 and 23, a head-form 140 may be included as part of the helmet's packaging. The head-form 140 may be made of expanded polystyrene (EPS) or of another suitable material. The head-form 140 preferably includes a base region 144 configured to fit within a packaging box 146. The base region 144 preferably includes side openings 148 to accommodate the ear-loops 70 and the chin strap 84 of the helmet 10.

The head-form 140 substantially fills the interior of the helmet 10 and substantially prevents the liner padding 15 from being dented or damaged during shipping and handling. The liner padding in many existing helmets, conversely, often becomes marked or dented because the padding is exposed during shipping and while the helmet rests on a shelf.

The head-form 140 preferably includes a slot 142 or opening in its rear upper region, or in another suitable location. The slot 142 provides flexibility so that the head-form 140 may accommodate different helmet sizes. For example, when a medium helmet is placed over the head-form 140, the sides of the head-form 140 are pressed toward each other such that the slot 142 is narrowed. When a small helmet is placed over the head-form 140, the sides of the head-form 140 are pressed toward each other to a greater degree such that the slot 142 is narrowed even further. Accordingly, the head-form 140 may be snugly secured within helmets of various sizes.

The various helmet components described herein, if not otherwise specified, may be made of any suitable material or combination of materials. While specific elements are often described above, in many cases, other suitable elements may be used in their place (e.g., wing-nuts may be used instead of screws, where applicable).

Any of the above-described embodiments may be used alone or in combination with one another. Furthermore, the adjustable helmet may include additional features not described herein. While several embodiments have been shown and described, various changes and substitutions may of course be made, without departing from the spirit and scope of the invention. The invention, therefore, should not be limited, except by the following claims and their equivalents.

What is claimed is:

1. An adjustable helmet, comprising:
a first shell;
padding attached to the first shell;
a second shell engaged with the first shell;
a plurality of substantially rigid straps connected to the first shell and extending into the second shell;
a cam assembly on the second shell in engagement with the straps, wherein the straps are movable relative to the cam assembly, and the cam assembly includes a cam handle that is pivotable between:
an open position in which the straps are free to move through the cam assembly, such that the first shell may be longitudinally adjusted relative to the second shell; and
a closed position in which the straps are prevented from moving through the cam assembly, such that the first shell is prevented from being longitudinally adjusted relative to the second shell.

2. The helmet of claim 1 wherein the first shell is a front shell and the second shell is a rear shell, or the first shell is a rear shell and the second shell is a front shell.

3. The helmet of claim 1 further comprising a lateral adjustment mechanism including a plurality of bands attached directly or indirectly to the first shell or the second shell, wherein the bands are configured to engage sides of a wearer's head.

4. The helmet of claim 3 wherein the lateral adjustment mechanism further includes a device for tightening and loosening the bands.

5. The helmet of claim 3 further comprising a pad attached to the lateral adjustment mechanism for engaging an occipital portion of a wearer's head.

6. The helmet of claim 1 further comprising a height-adjustable earpiece on the helmet.

7. The helmet of claim 1 further comprising a height-adjustable J-clip attached to the first shell via at least one threaded connector, with the J-clip including a slot positioned around the threaded connector for allowing the J-clip to be vertically adjusted relative to the first shell when the threaded connector is loosened without requiring removal of the threaded connector from the first shell.

8. The helmet of claim 1 further comprising an ear loop including a raised ledge configured to pass through a slot in the helmet and to engage an inner surface of the helmet to maintain the ear loop in an upward position.

9. The helmet of claim 1 further comprising padding in an interior of the second shell, and a rear-projecting tab on an interior surface of the second shell that engages a slot in the padding to prevent rotation of the padding.

10. An adjustable helmet, comprising:
a first shell;
a second shell engaged with the first shell;
a plurality of substantially rigid straps connected to the first shell and extending into an interior region of the second shell, with each of the straps including an opening;
a cam assembly attached to an exterior region of the second shell, the cam assembly including a cam post extending into the interior region of the second shell and through the openings in the straps, and a cam plate on the cam post;
wherein the cam assembly is movable between:
a closed position in which the cam plate secures the straps against the second shell, such that the first shell is prevented from being longitudinally adjusted relative to the second shell, and
an open position in which the straps are free to move about the cam post such that the first shell may be longitudinally adjusted relative to the second shell.

11. The helmet of claim 10 wherein the first shell is a front shell and the second shell is a rear shell, or the first shell is a rear shell and the second shell is a front shell.

12. An adjustable helmet, comprising:
a first shell;
padding attached to the first shell;

a second shell *movably* engaged with the first shell;

a plurality of substantially rigid straps connected to the first shell and extending into the second shell;

a cam assembly on an exterior region of the second shell in engagement with the plurality of straps, wherein the cam assembly is not engageable with the first shell.

13. An adjustable helmet, comprising:

a front shell;

padding attached to the front shell;

a rear shell *movably* engaged with the front shell;

at least one substantially rigid strap attached to the front shell and extending into the rear shell; and a cam assembly on an exterior region of the rear shell that is engageable with the strap, wherein the cam assembly includes a cam handle that is pivotable between an open position and a closed position.

14. The helmet of claim 13 wherein the strap is attached to an upper region of the front shell such that, in use, the strap overlies the top of a wearer's head.

15. The helmet of claim 13 wherein engagement of the cam assembly with the strap substantially prevents longitudinal adjustment of the front shell relative to the rear shell.

16. The helmet of claim 13 wherein the cam assembly is located on a rear-exterior region of the rear shell.

17. The helmet of claim 13 wherein the strap comprises at least one opening engageable by the cam assembly.

18. An adjustable helmet, comprising:

a first shell;

padding attached to the first shell;

a second shell engaged with the first shell;

at least one substantially rigid strap attached to the first shell and extending into the second shell, wherein the strap is contained within the interior of the helmet; and means for engaging the strap to substantially prevent longitudinal movement of the first shell relative to the second shell, wherein the means for engaging is located on a [rear exterior region] *rear-facing exterior surface* of the second shell.

*19. A helmet, having a front region, a rear region, and generally opposite side regions, the helmet comprising:*

*a. an external protective shell, the external protective shell circumscribing an inside region for receiving a wearer's head;*

*b. padding material in the inside region, the padding material residing between the protective shell and the head of the wearer when the helmet is being worn;*

*c. an occipital adjustment system, including:*

*i. a manually operable adjustment device in the inside region and facing a rear of the wearer's head when the helmet is being worn;*

*ii. a pair of straps, the straps projecting from opposite sides of the adjustment device toward respective side regions of the helmet and each strap extending along a respective side region of the helmet toward the front region thereof;*

*iii. an occipital pad on the adjustment device configured to engage an occipital region of the wearer's head;*

*iv. the manually operable adjustment device being operable by the wearer to selectively tighten or loosen the straps;*

*v. an attachment portion connected to the adjustment device extending upwardly therefrom to connect the adjustment device to a portion of the helmet that is located above the adjustment device;*

*d. the external protective shell including a rear portion facing the rear of the wearer's head when the helmet is worn, the rear portion including a segment of a rear edge of the protective shell, the rear portion overlapping the adjustment device and the occipital pad, whereby the adjustment device and the occipital pad reside between the rear portion and the wearer's head when the helmet is worn.*

*20. The helmet of claim 19, wherein the manually operable adjustment device is operable by the wearer to selectively tighten or loosen the straps to displace the straps toward and away from the head of the wearer when the helmet is being worn.*

*21. The helmet of claim 19, wherein the manually operable adjustment device includes a dial mounted in a dial housing.*

*22. The helmet of claim 19 wherein the occipital pad is mounted to the dial housing.*

*23. The helmet of claim 19, wherein the upwardly extending attachment portion includes a plurality of arms connecting the adjustment device to the portion of the helmet located above the adjustment device.*

*24. The helmet of claim 23, wherein the plurality of arms are spaced apart from each other.*

*25. The helmet of claim 24, wherein the plurality of arms extend upwardly from the adjustment device.*

*26. The helmet of claim 19, wherein the attachment portion extends upwardly from the adjustment device to connect the adjustment device to the padding material.*

*27. The helmet of claim 23, wherein the plurality of arms include a first arm and a second arm that extend upwardly and meet at a common point of connection that is fastened to the padding material.*

*28. The helmet of claim 19, wherein the external protective shell includes a first shell portion and a second shell portion, the first shell portion being engaged with the second shell portion in an overlapping relationship whereby the first and the second shell portions define a mutual area of overlap, a position of the first and the second shell portions relative to each other being adjustable to vary an extent of the mutual area of overlap independently of the occipital adjustment system.*

*29. An adjustable helmet, comprising:*

*a. a shell including a first shell portion engaged with a second shell portion, the first shell portion being engaged with the second shell portion in an overlapping relationship whereby the first and the second shell portions define a mutual area of overlap, a position of the first and the second shell portions relative to each other being adjustable to vary an extent of the mutual area of overlap;*

*b. the shell circumscribing an inside region for receiving the wearer's head, a size of the inside region being variable to adjust a fit of the helmet on the wearer's head by adjusting the position of the first and second shell portions relative to each other;*

*c. padding in the inside region, the padding being located between the shell and the wearer's head when the helmet is worn;*

*d. a plurality of substantially rigid straps in the inside region extending between the first shell portion and the second shell portion;*

*e. a locking assembly including a manually operable locking actuator on an exterior region of the shell, the locking assembly capable to selectively acquire a locked condition and an unlocked condition, wherein in the locked condition the locking assembly engages the plurality of straps through an aperture in the shell to prevent the plurality of straps from moving with rela-*

*tion to the locking assembly and to prevent the position of the first and second shell portions to change relative to each other;*

*f. the locking assembly constituting the only device on the helmet for adjusting the position of the first and second shell portions relative to each other.*

*30. The helmet of claim 29, wherein the helmet has a front region, a rear region, and a pair of opposite side regions, the helmet having a longitudinal axis extending along a direction from the front region to the rear region and a transverse axis extending in a direction from one side region to another side region, the plurality of straps having portions extending generally along the transverse axis.*

*31. The helmet of claim 29, wherein the plurality of straps are in an overlapping relationship, the locking assembly and the plurality of straps being configured such that as the position of the first and second shell portions is adjusted, a degree of overlap of the plurality of straps changes.*

*32. The helmet of claim 31, wherein the helmet has a top portion and a rear edge, the plurality of straps residing between the top portion and the rear edge.*

*33. The helmet of claim 32, wherein the manually operable locking actuator includes a lever pivotable between the locked condition and the unlocked condition.*

*34. The helmet of claim 33, wherein the locking assembly includes a component connected to the lever and projecting through the aperture in the shell to engage the plurality of straps at a location at which they overlap.*

*35. The helmet of claim 34, wherein the plurality of straps include respective apertures, the overlapping relationship between the plurality of straps causing the apertures to register with each other.*

*36. The helmet of claim 35, wherein the component engages the apertures that register with each other.*

*37. The helmet of claim 33, wherein the lever is located generally at a midpoint between side regions of the helmet.*

*38. The helmet of claim 33, wherein the lever is pivotable about a generally horizontal axis.*

*39. The helmet of claim 38, wherein the lever resides between the top portion and the rear edge.*

*40. The helmet of claim 29, wherein the substantially rigid straps are connected to the first shell portion, the helmet being configured such that a movement of the first shell portion relative to the second shell portion to adjust the fit of the helmet to the wearer's head imparts a corresponding movement of the substantially rigid straps relative to the locking assembly.*

*41. The helmet of claim 40, wherein the shell includes strap guides configured to receive the respective straps, wherein when the position of the first and second shell portions is adjusted, the straps are displaced relative to their respective strap guides.*

*42. The helmet of claim 38, wherein the exterior region of the helmet includes a recessed portion that receives the lever when the lever is in the locked condition.*

*43. The helmet of claim 29, wherein the first shell portion is a front shell portion.*

*44. The helmet of claim 43, wherein the second shell portion is a rear shell portion.*

*45. The helmet of claim 28, wherein the helmet has a longitudinal axis extending from a front of the helmet to a back of the helmet, the position of the first and the second shell portions relative to each other being adjustable by moving the first shell portion and the second shell portion along the longitudinal axis.*

*46. The helmet of claim 45, wherein the mutual area of overlap extends in a direction generally transverse to the longitudinal axis.*

*47. The helmet of claim 28, wherein the mutual area of overlap extends along a portion of the helmet extending along a top region of the helmet to a lower edge of the helmet.*

*48. The helmet of claim 29, wherein the mutual area of overlap extends along a portion of the helmet extending along a top region of the helmet to a lower edge of the helmet.*

* * * * *